United States Patent
Toya

(10) Patent No.: US 9,711,988 B2
(45) Date of Patent: Jul. 18, 2017

(54) FUEL CELL SYSTEM, METHOD FOR CONTROLLING FUEL CELL SYSTEM, AND STORAGE BATTERY SYSTEM

(71) Applicant: Panasonic Corporation, Osaka (JP)

(72) Inventor: Shoichi Toya, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 376 days.

(21) Appl. No.: 14/380,769

(22) PCT Filed: May 29, 2013

(86) PCT No.: PCT/JP2013/003387
§ 371 (c)(1),
(2) Date: Aug. 25, 2014

(87) PCT Pub. No.: WO2013/179661
PCT Pub. Date: Dec. 5, 2013

(65) Prior Publication Data
US 2015/0021992 A1    Jan. 22, 2015

(30) Foreign Application Priority Data
Jun. 1, 2012  (JP) ............................... 2012-126491

(51) Int. Cl.
*H01M 8/00*    (2016.01)
*H02J 7/00*    (2006.01)
(Continued)

(52) U.S. Cl.
CPC ......... *H02J 7/0068* (2013.01); *H01M 8/0494* (2013.01); *H01M 8/04619* (2013.01);
(Continued)

(58) Field of Classification Search
USPC ......................................................... 307/25
See application file for complete search history.

(56) References Cited

U.S. PATENT DOCUMENTS 6,847,127 B1 * 1/2005 Lee .................... B60L 11/1861
290/40 C
8,569,906 B2   10/2013 Stolte et al.
(Continued)

FOREIGN PATENT DOCUMENTS

JP          61-21516       1/1986
JP          2001-68125     3/2001
(Continued)

OTHER PUBLICATIONS

Partial Supplementary European Search Report issued Mar. 31, 2015 in corresponding European Patent Application No. 13797433.3.
(Continued)

*Primary Examiner* — Rexford Barnie
*Assistant Examiner* — Xuan Ly
(74) *Attorney, Agent, or Firm* — Wenderoth, Lind & Ponack, L.L.P.

(57) ABSTRACT

The fuel cell system includes: a power generation unit; an obtaining unit obtaining battery information indicating a storage state of a storage battery; and a control unit selecting one of a first control mode and a second control mode based on the battery information when load power changes from a first load power to a second load power, the first control mode being for supplying power from the power generation unit to the load by causing the power generation unit to generate power without causing the storage battery to charge and/or discharge, the second control mode being for causing the power generation unit to generate power with a change rate of generation power being set to a value smaller than a
(Continued)

value in the first control mode, by causing the storage battery to charge and/or discharge.

14 Claims, 16 Drawing Sheets

(51) Int. Cl.
  *H01M 8/04828*  (2016.01)
  *H01M 16/00*  (2006.01)
  *H01M 8/04537*  (2016.01)
  *H02J 15/00*  (2006.01)
  *H02J 1/00*  (2006.01)

(52) U.S. Cl.
  CPC ... *H01M 8/04626* (2013.01); *H01M 8/04947* (2013.01); *H01M 16/006* (2013.01); *H02J 15/003* (2013.01); *H02J 2001/004* (2013.01); *Y10T 307/359* (2015.04)

(56) References Cited

U.S. PATENT DOCUMENTS

2006/0240291 A1\* 10/2006 Kim .................. H01M 8/04559
                 429/9
2010/0019568 A1 1/2010 Stolte et al.
2010/0090642 A1\* 4/2010 Brantley ............. H01M 2/1022
                 320/101

FOREIGN PATENT DOCUMENTS

| | | |
|---|---|---|
| JP | 2003-87993 | 3/2003 |
| JP | 2004-265771 | 9/2004 |
| JP | 2008-130424 | 6/2008 |
| JP | 2008-310985 | 12/2008 |
| JP | 2009-509835 | 3/2009 |
| JP | 2009-261199 | 11/2009 |
| JP | 2011-83059 | 4/2011 |
| WO | 2007/039211 | 4/2007 |

OTHER PUBLICATIONS

International Search Report issued Aug. 20, 2013 in corresponding International Application No. PCT/JP2013/003387.
Reply to Written Opinion issued Aug. 20, 2013 in corresponding International Application No. PCT/JP2013/003387 (with partial English translation).

\* cited by examiner

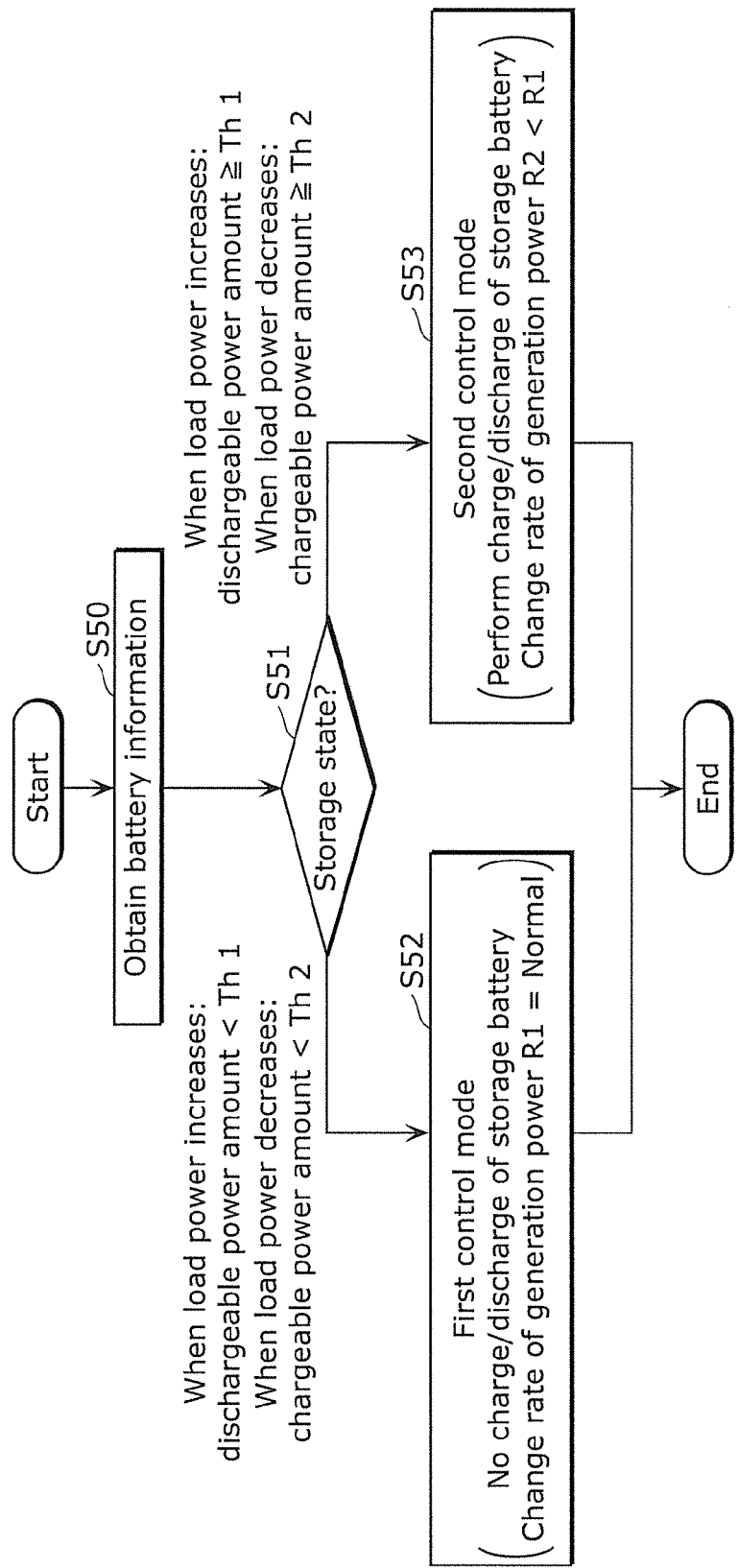

FUEL CELL SYSTEM, METHOD FOR CONTROLLING FUEL CELL SYSTEM, AND STORAGE BATTERY SYSTEM

TECHNICAL FIELD

The present invention relates to fuel cell systems, methods for controlling the fuel cell systems, and storage battery systems, and in particular to a fuel cell system connected to a storage battery.

BACKGROUND ART

In recent years, a fuel cell system has gradually come into widespread use as a power supply which is possibly capable of significantly contributing to solving energy issues and environmental issues. The fuel cell system generates power in an electrochemical reaction of hydrogen with oxygen in a power generation unit called a cell stack.

The power generation unit of the fuel cell system has the characteristics that it is not possible to rapidly change the amount of power to be generated. For that reason, with the fuel cell system, surplus power is supplied to an electric heater which heats water in a hot water storage tank, thereby implementing power supply that follows a rapid change in load power (hereinafter also referred to simply as "load") (see Patent Literature (PTL) 1, for example).

CITATION LIST

Patent Literature

[PTL 1] Japanese Unexamined Patent Application Publication No. 2001-68125

SUMMARY OF INVENTION

Technical Problem

The water in the hot water storage tank, however, cools down over time, and thus adjusting power by supplying the surplus power to the electric heater is not necessarily efficient.

Here, it can be considered that, in order to improve the followability for a change in load power (hereinafter also referred to simply as "load change"), a temporal change in power generated by the power generation unit (generation power); that is, a change rate of generation power, is set to a value as large as possible. However, when the change rate of generation power is set to a large value, there is a problem that a product life of the fuel cell system is reduced due to such an issue as a supply rate of a hydrogen gas in the fuel cell system, and the like.

The present invention has been conceived in view of the above-described problems, and an object of the present invention is to provide a fuel cell system, a method for controlling a fuel cell system, and a storage battery system which can adapt to a rapid load change without sacrificing the product life of the fuel cell system.

Solution to Problem

In order to achieve the above-described object, an aspect of a fuel cell system according to the present invention is a fuel cell system which is connected to a storage battery and supplies power to a load, the fuel cell system including: a power generation unit configured to generate power; an obtaining unit configured to obtain battery information indicating a storage state of the storage battery; and a control unit configured to select one of a first control mode and a second control mode based on the battery information when load power that is demand power of the load changes from a first load power to a second load power, the first control mode being for supplying power from the power generation unit to the load by causing the power generation unit to generate power without causing the storage battery to charge and discharge, the second control mode being for causing the power generation unit to generate power with a change rate of generation power being set to a value smaller than a value in the first control mode, by causing the storage battery to supply power to the load or causing the storage battery to charge or discharge in such a manner that the storage battery is charged with at least part of power supplied from the power generation unit, the change rate of generation power being a temporal change in the generation power of the power generation unit.

Advantageous Effects of Invention

According to the above-described aspect, a fuel cell system, a method for controlling the fuel cell system, and a storage battery system, which can follow a rapid load change without sacrificing a product life of the fuel cell system are provided.

Accordingly, the present invention is of great practical value now that the fuel cell systems which can possibly contribute to solving the energy issues and the environmental issues have come into widespread use.

Figure 3:
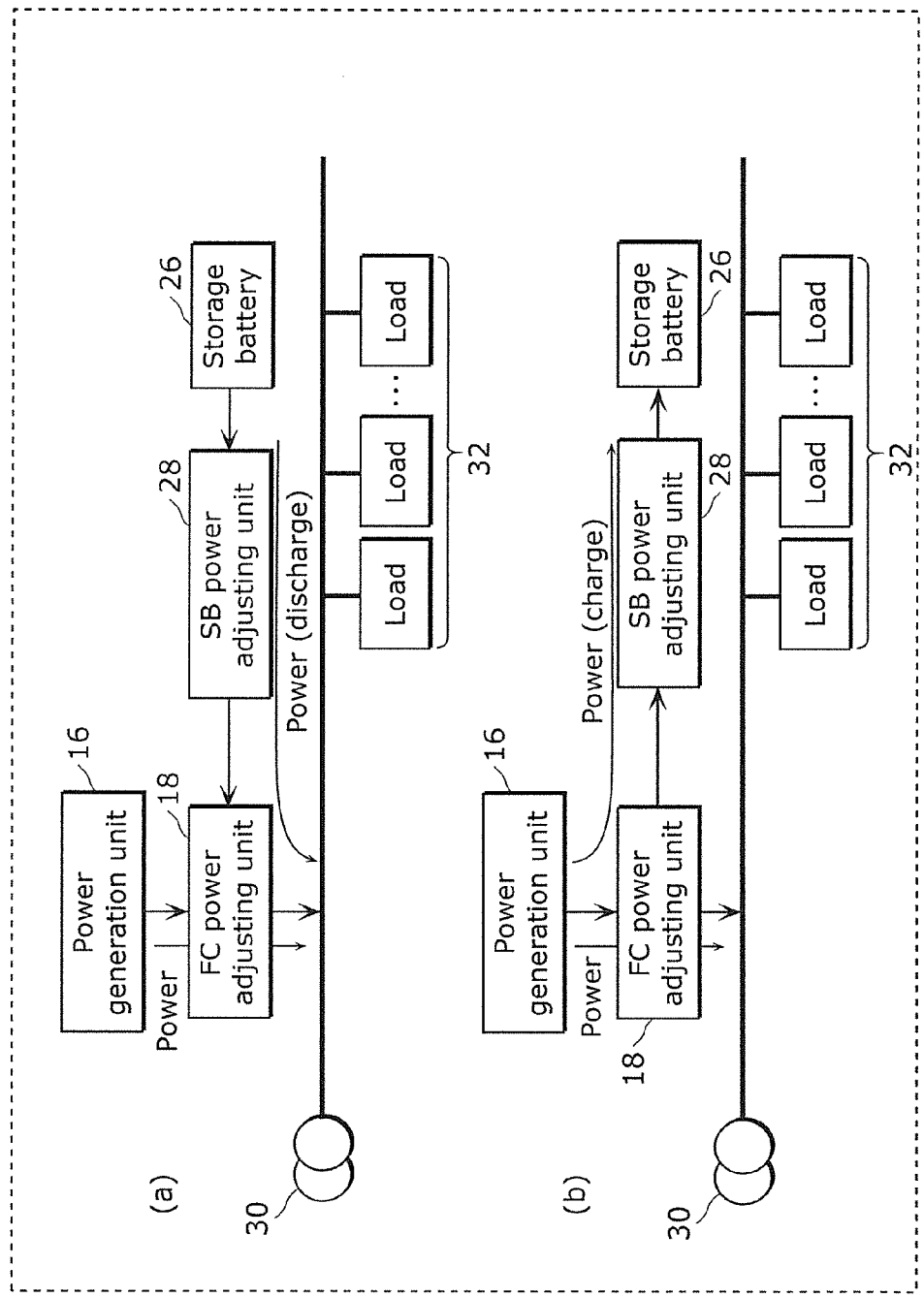

(a) in FIG. 3 is a diagram illustrating a flow of power supply to a load in the case where demand power of the load rapidly increases, and (b) in FIG. 3 is a diagram illustrating a flow of power supply from a power generation unit to in the case where demand power of the load rapidly decreases.

Figure 4:
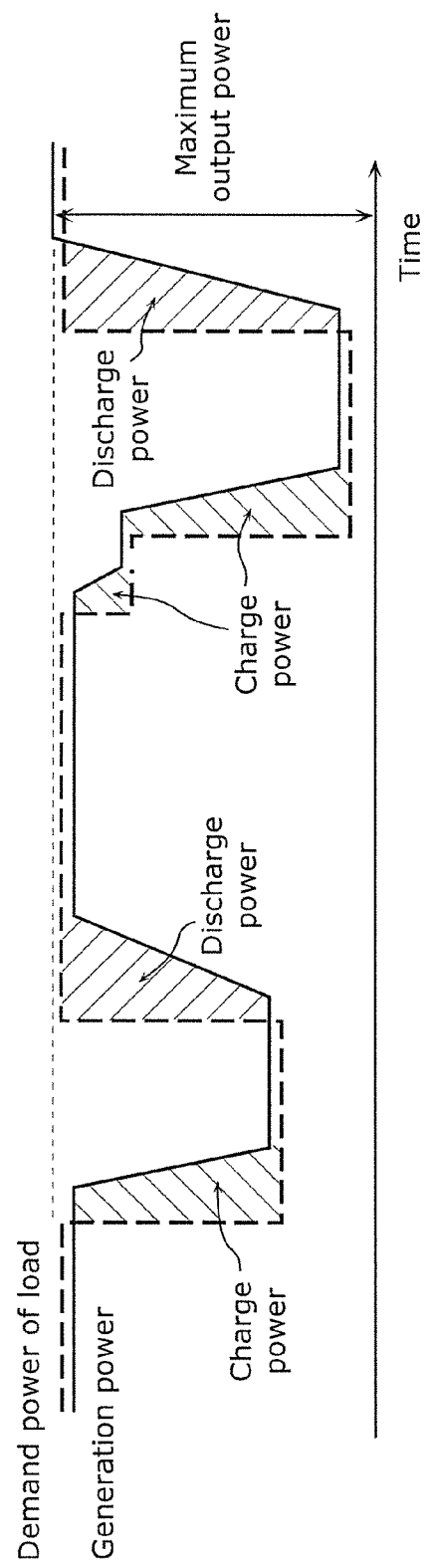

FIG. 4 is a diagram illustrating the state of power supply as a result of the control illustrated in FIG. 3.

Figure 5:
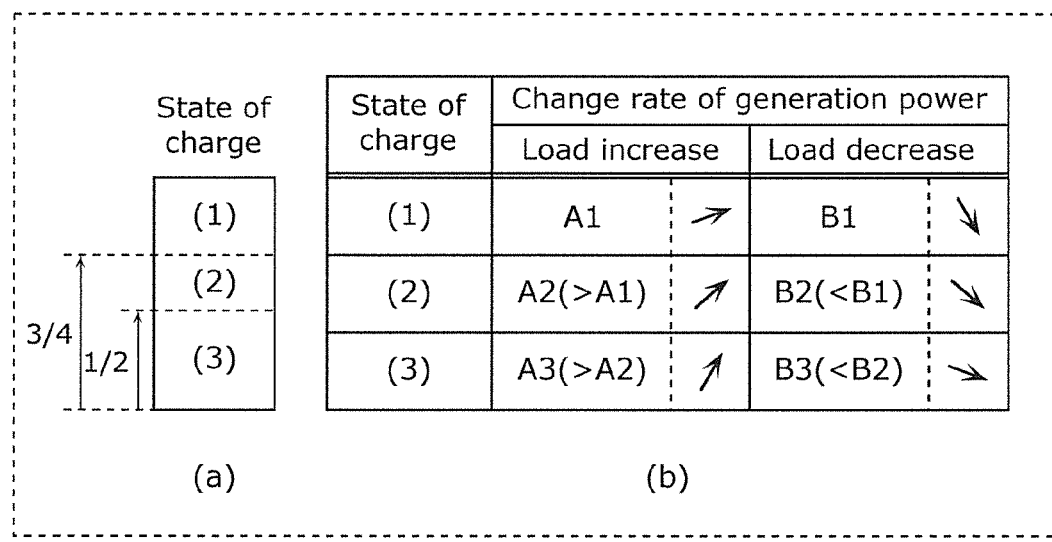

FIG. 5 is a diagram illustrating an example of a relationship between a state of charge of the storage battery and a change rate of generation power of the power generation unit.

FIG. 6 is a flowchart illustrating a basic operation of the fuel cell system according to Embodiment.

Figure 7A:
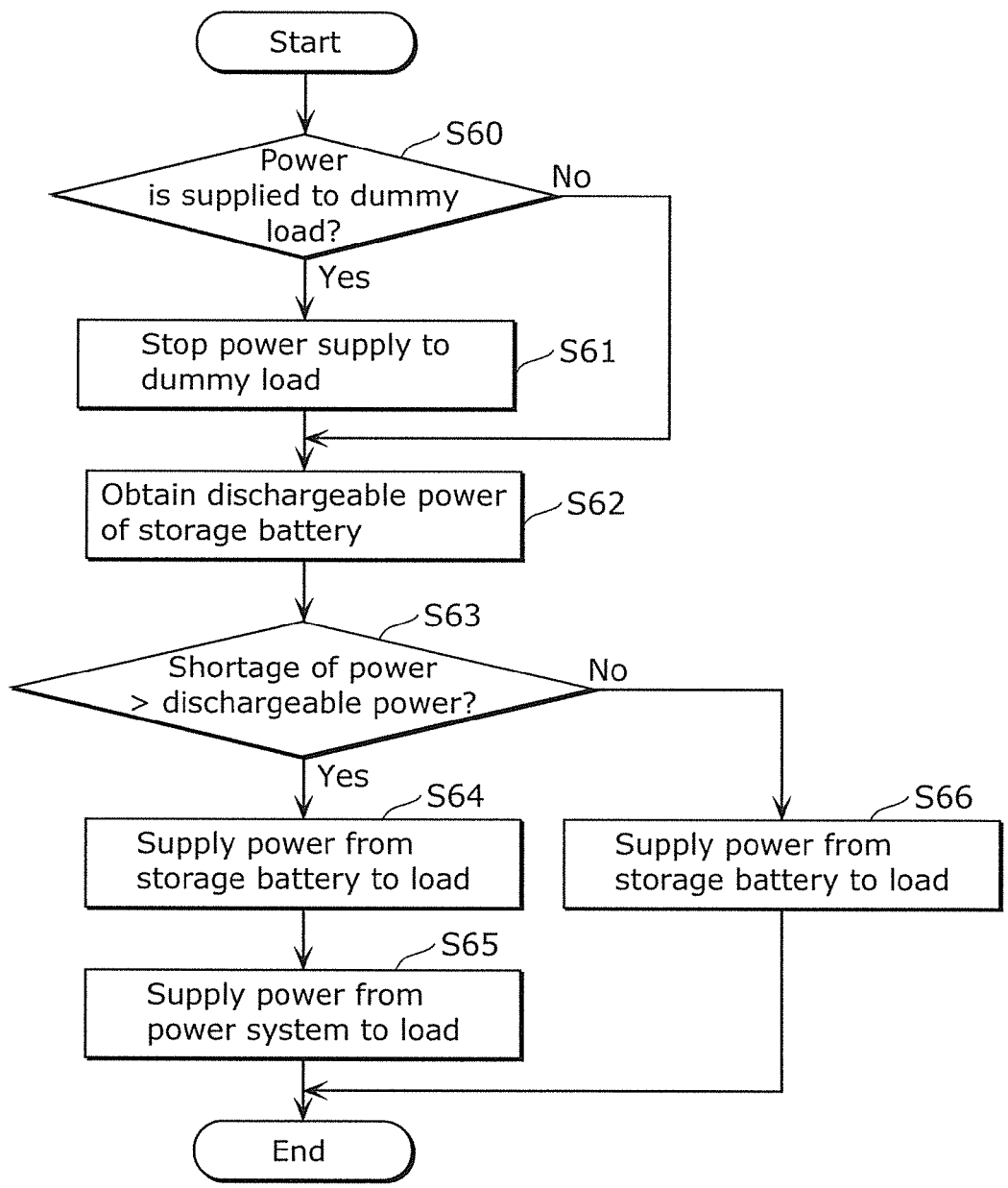

FIG. 7A is a flowchart illustrating an operation of the fuel cell system, which is related to use of a power system in a second control mode.

Figure 7B:
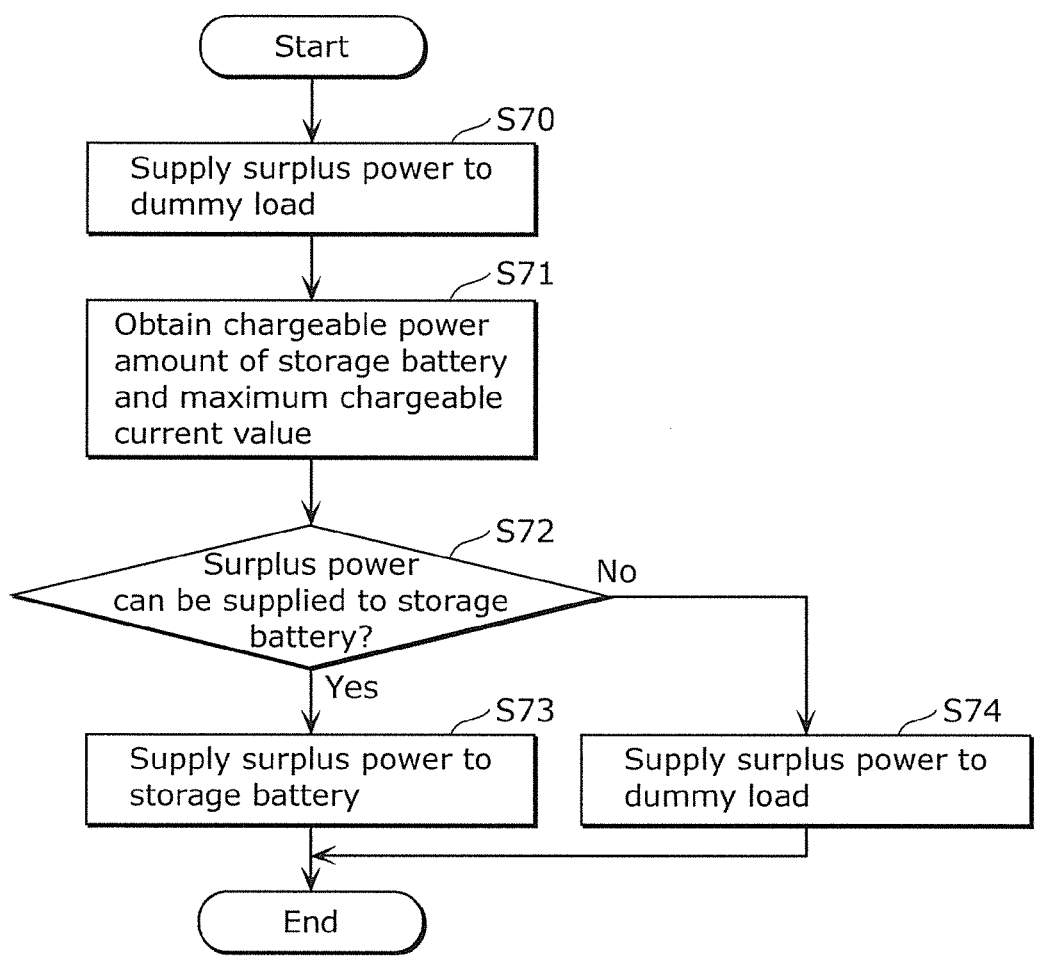

FIG. 7B is a flowchart illustrating an operation of the fuel cell system, which is related to use of a dummy load in the second control mode.

Figure 8A:
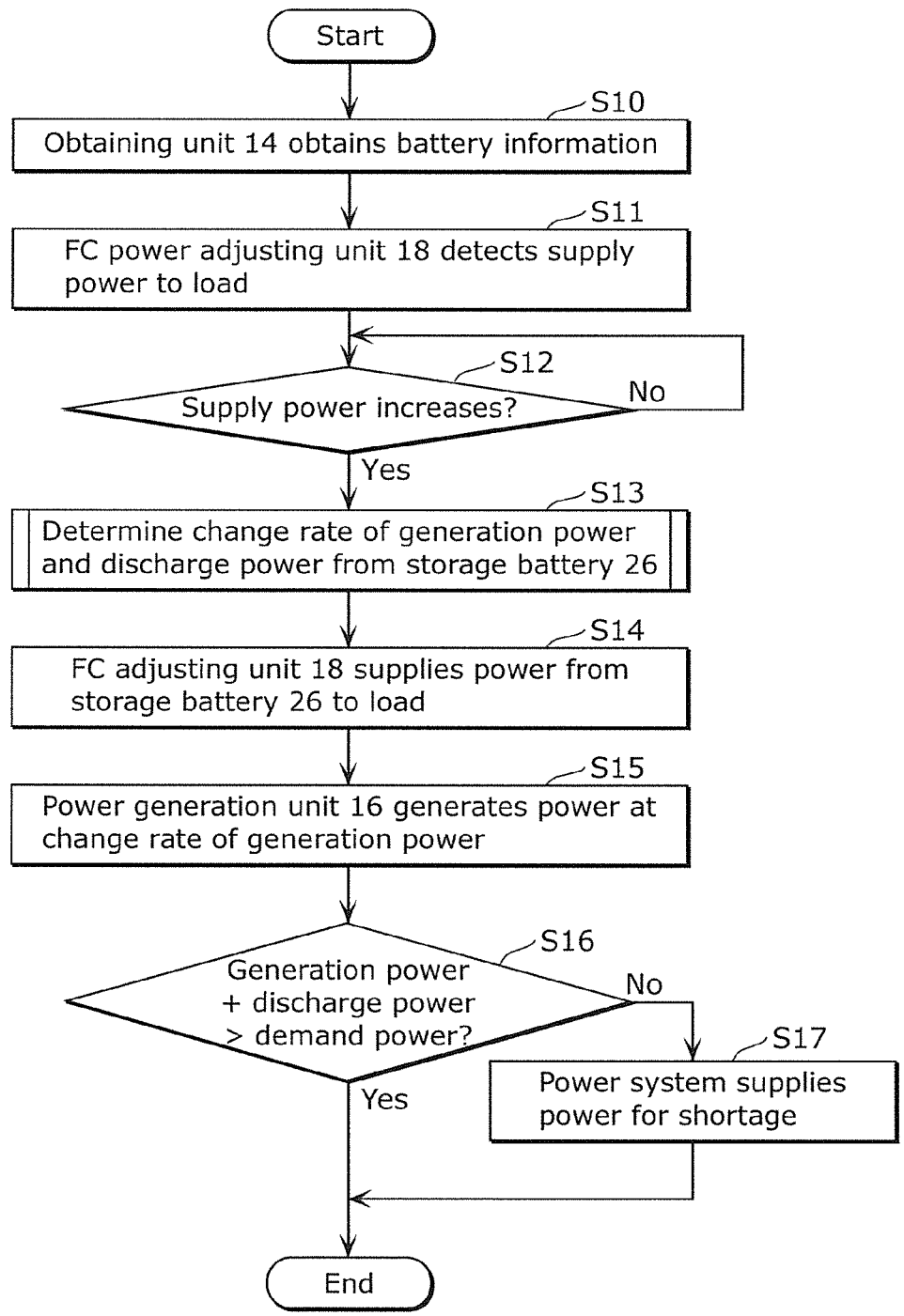

FIG. 8A is a flowchart illustrating an operation of the fuel cell system in the case where demand power of the load increases.

Figure 8B:
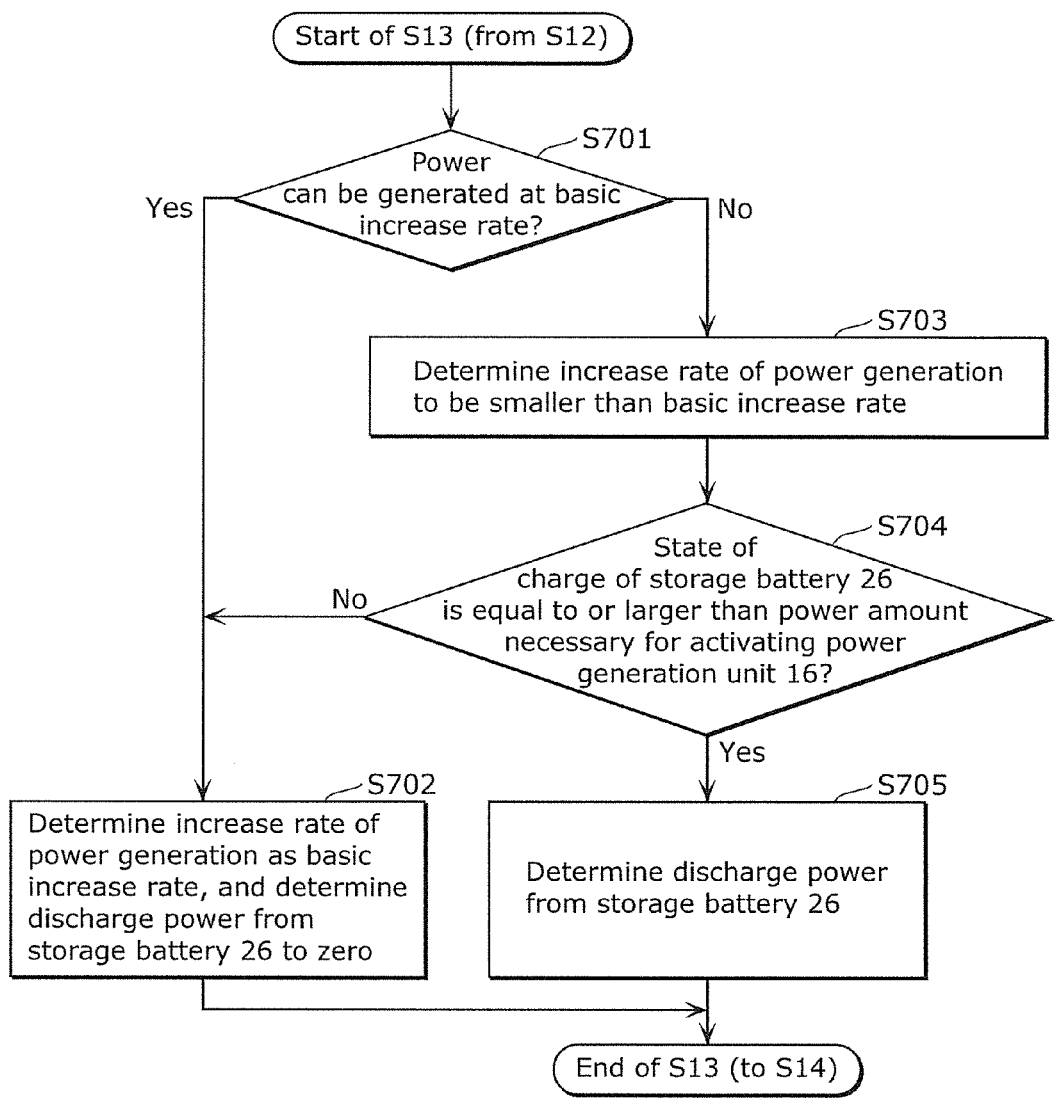

FIG. 8B is a flowchart illustrating a detailed procedure of Step S13 illustrated in FIG. 8A.

Figure 9:
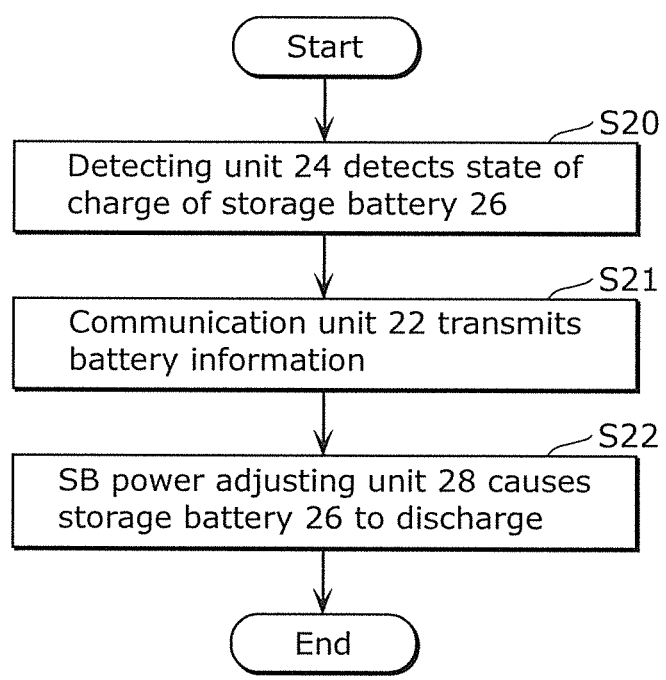

FIG. 9 is a flowchart illustrating an operation of the fuel cell system in the case where demand power of the load increases.

Figure 10A:
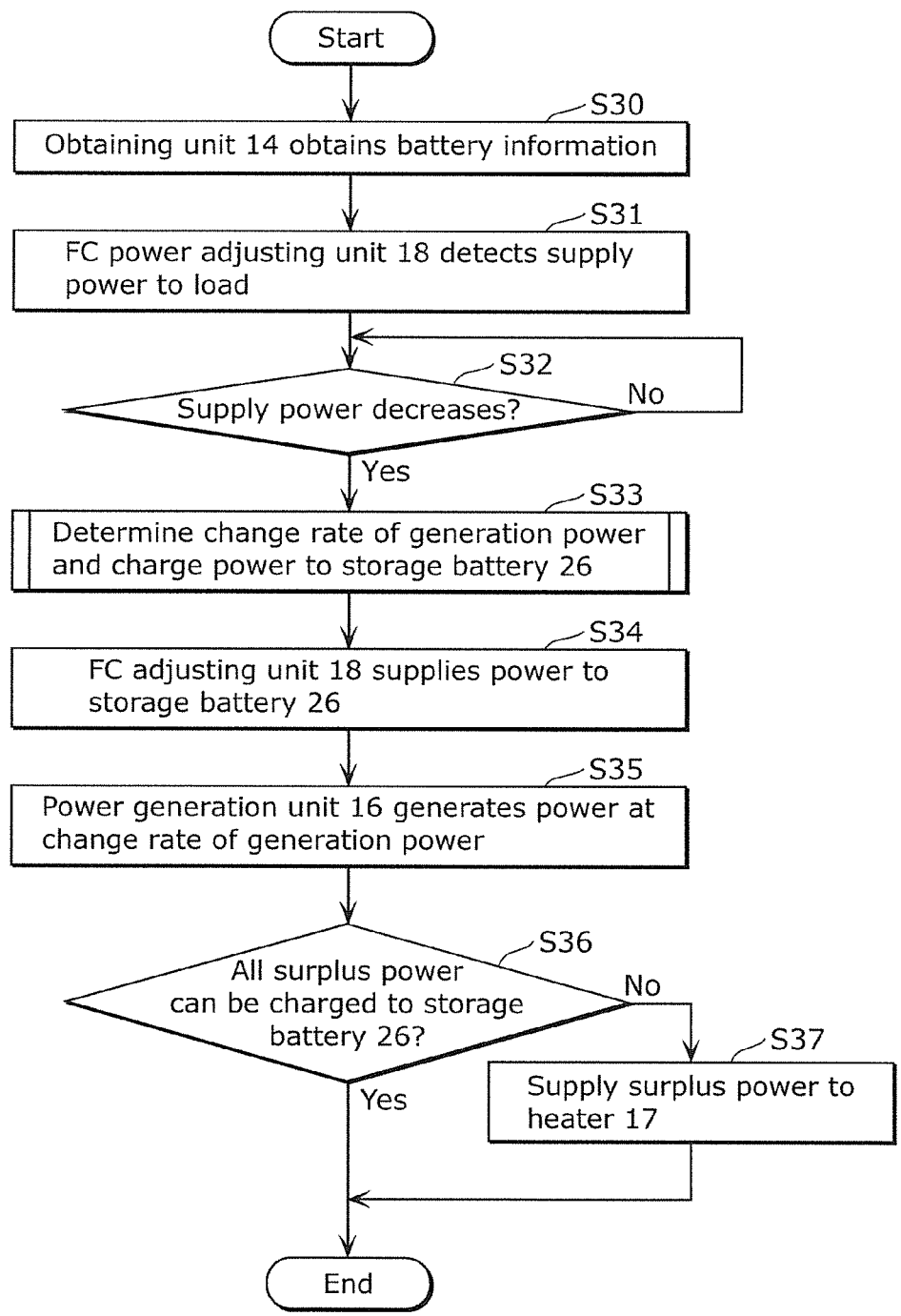

FIG. 10A is a flowchart illustrating an operation of the fuel cell system in the case where demand power of the load decreases.

Figure 10B:
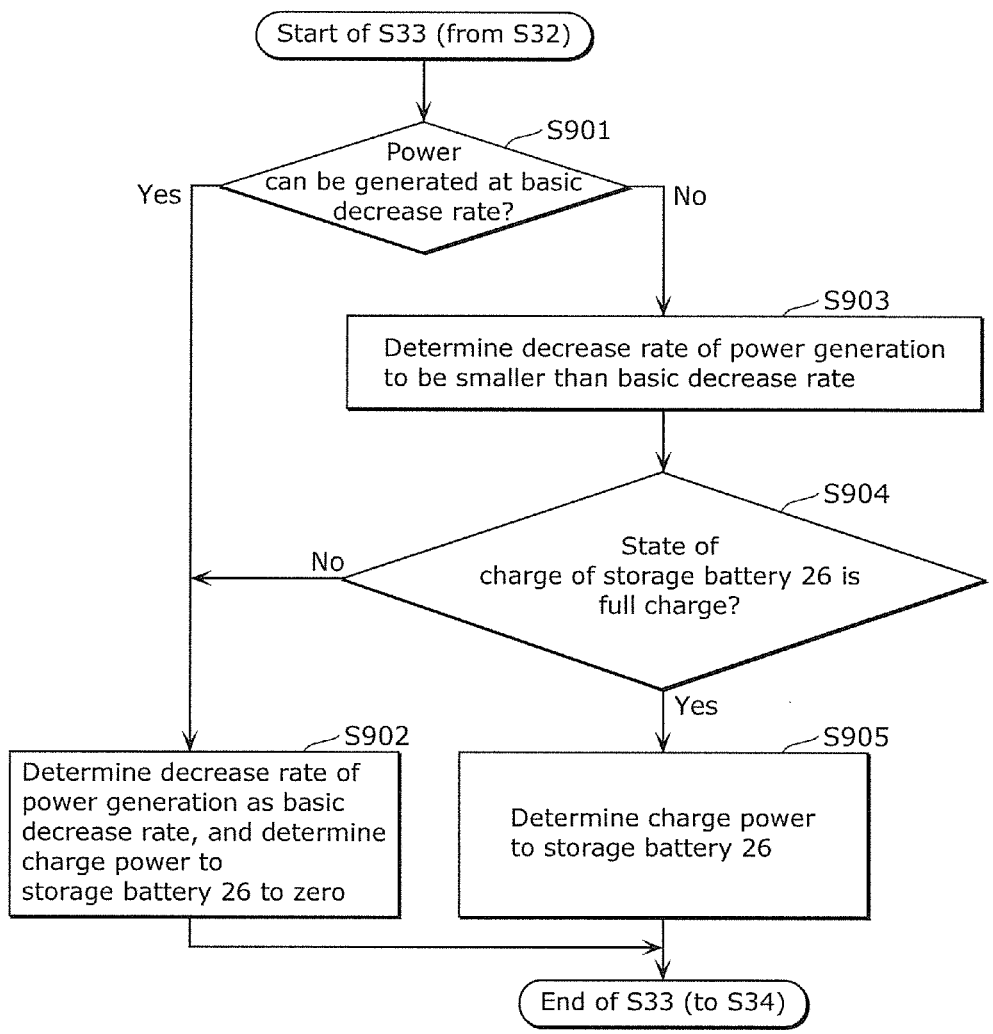

FIG. 10B is a flowchart illustrating a detailed procedure of Step S33 illustrated in FIG. 10A.

Figure 11:
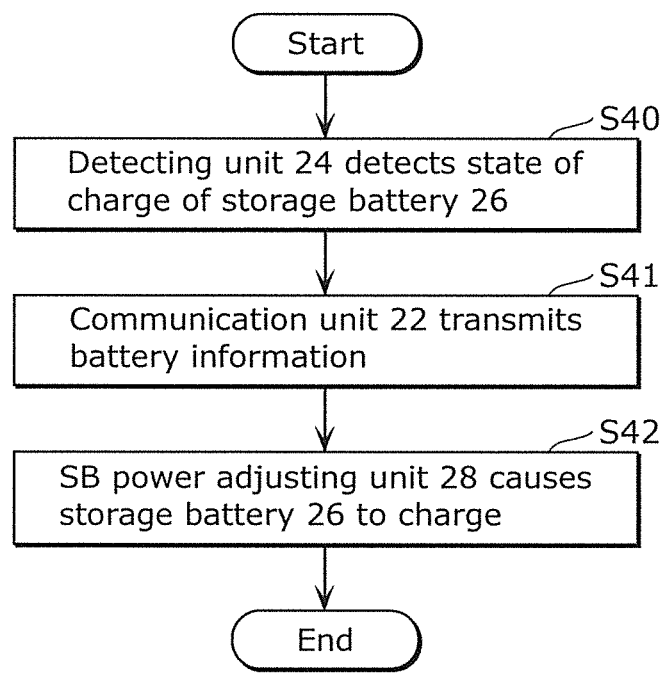

FIG. 11 is a flowchart illustrating an operation of the fuel cell system in the case where demand power of the load decreases.

Figure 12:
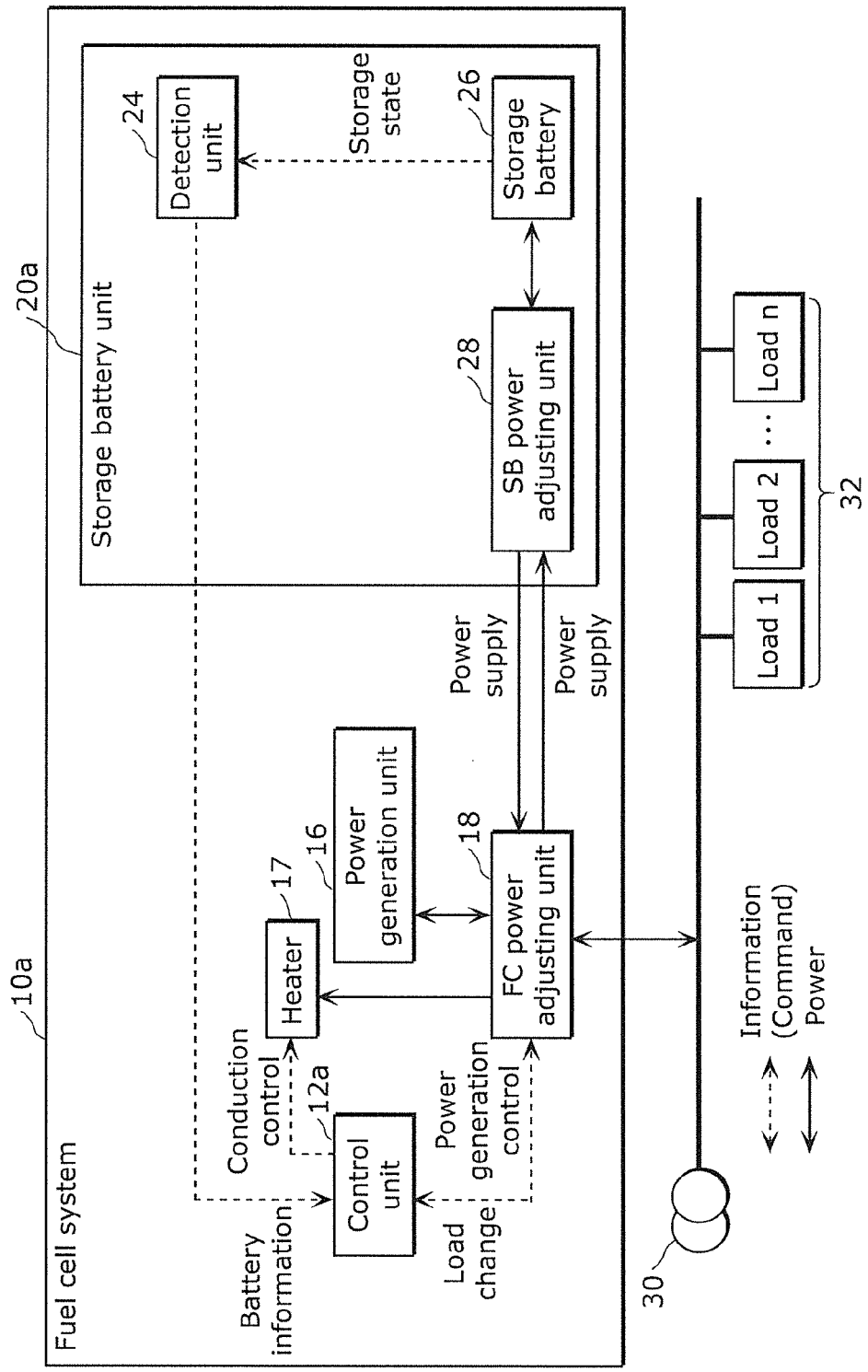

FIG. 12 is a block diagram illustrating a configuration of a fuel cell system according to a first modification example.

Figure 13:
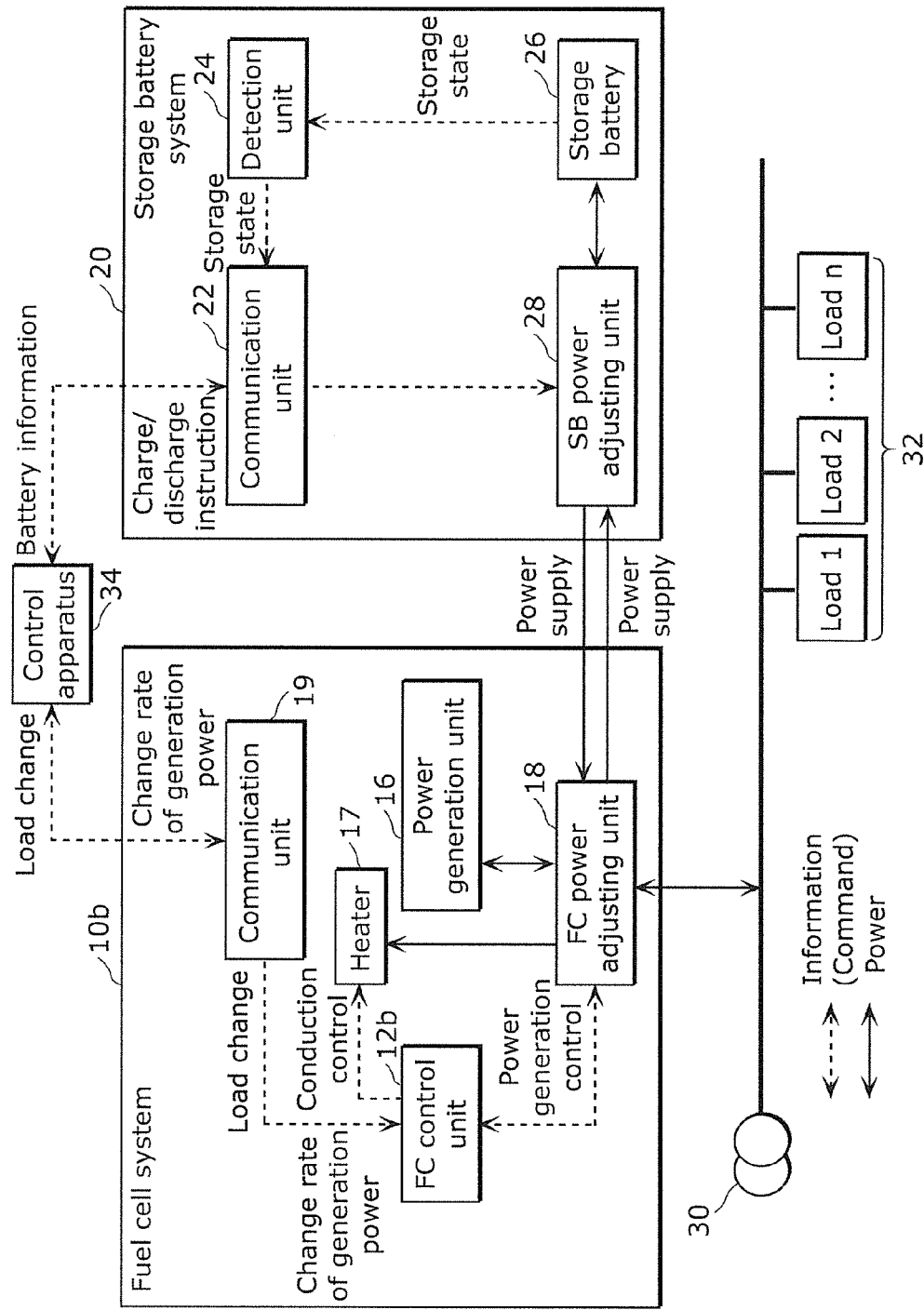

FIG. 13 is a block diagram illustrating a configuration of a fuel cell system according to a second modification example.

DESCRIPTION OF EMBODIMENTS (Underlying Knowledge Forming Basis of the Present Disclosure)

The inventors have invented a fuel cell system which operates in cooperation with a storage battery, in order to meet a demand for following a rapid load change without sacrificing a product life of the fuel cell system. More specifically, in the case where power generated by the power generation unit of the fuel cell system is not sufficient for a load, power is also supplied from the storage battery to the load (in other words, the storage battery is caused to discharge), and contrary to this, in the case where surplus power is created in the power generated by the power generation unit of the fuel cell system, the surplus power is supplied to the storage battery (in other words, storage battery is caused to charge). This allows power supply in such a manner that follows a rapid load change without wasting surplus power.

At this time, the state of charge of the storage battery is monitored to control the discharge power amount of the storage battery so that the state of charge does not fall below a power amount necessary for activating the fuel cell system. Furthermore, charge and/or discharge of the storage battery is controlled so that the change rate of generation power of the power generation unit does not exceed a certain value (in other words, so that power generated by the power generation unit does not change rapidly) to prevent reducing the product life of the fuel cell system.

In addition, the fuel cell system is activated normally in response to power supply from the power system, and thus it is not possible to activate the fuel cell system when the power supply from the power system is stopped. In recent years, however, a demand for activating the fuel cell system even when power supply from the power system is stopped due to power failure or the like (in other words, a demand for self-sustained operation) has been increasing. For that reason, it is also necessary to meet such a demand.

(Outline of the Present Invention)

In view of the above, an aspect of a fuel cell system according to the present invention is a fuel cell system which is connected to a storage battery and supplies power to a load, the fuel cell system including: a power generation unit which generates power; an obtaining unit which obtains battery information indicating a storage state of the storage battery; and a control unit which selects one of a first control mode and a second control mode based on the battery information when load power that is demand power of the load changes from a first load power to a second load power, the first control mode being for supplying power from the power generation unit to the load by causing the power generation unit to generate power without causing the storage battery to charge and/or discharge, the second control mode being for causing the power generation unit to generate power with a change rate of generation power being set to a value smaller than a value in the first control mode, by causing the storage battery to supply power to the load or causing the storage battery to charge and/or discharge in such a manner that the storage battery is charged with at least part of power supplied from the power generation unit, the change rate of generation power being a temporal change in the generation power of the power generation unit.

With this, charge and/or discharge of the storage battery is utilized in the second control mode when the load power changes, and thus the change rate of generation power can be smaller than a change rate of generation power in the first control mode. It is therefore possible to follow a rapid load change without sacrificing a product life of the fuel cell system.

Here, the battery information may include a dischargeable power amount of the storage battery, and the control unit may, when the load power increases from the first load power to the second load power that is larger than the first load power, select the first control mode when the dischargeable power amount is smaller than a predetermined threshold, and select the second control mode in which the change rate of generation power is set to the value smaller than the value in the first control mode by causing the storage battery to supply power to the load, when the dischargeable power amount is equal to or larger than the predetermined threshold.

With this, power is supplied to the load from the storage battery in the second control mode even when the load power rapidly increases, and thus the change rate of generation power can be smaller than a change rate of generation power in the first control mode. It is therefore possible to follow a rapid load change without sacrificing a product life of the fuel cell system in the second control mode even when the load power rapidly increases.

In addition, the fuel cell system may further be connected to a power system, and the control unit may cause the storage battery and/or the power system to supply power to the load when the second control mode is selected.

At this time, the control unit may, with reference to the dischargeable power of the storage battery obtained by the obtaining unit as the battery information, cause the storage battery to supply power to the load when a shortage of power which is an amount of shortfall of the generation power below the second load power is equal to or smaller than the dischargeable power, and cause the power system and the storage battery to supply power to the load when the shortage of power is larger than the dischargeable power.

With this, in the case where the load power rapidly increases, power is supplied to the load not only from the storage battery but also from the power system in the second control mode. Thus, the change rate of generation power can be further smaller and the followability for a rapid load change can be improved.

In addition, when the generation power of the power generation unit is smaller than the second load power after the second control mode is selected, the obtaining unit may obtain the dischargeable power amount of the storage battery at regular time intervals, and the control unit may select the first control mode when the dischargeable power amount obtained at regular time intervals falls below the predetermined threshold.

With this, the dischargeable power of the storage battery is repeatedly monitored at regular time intervals, and the storage battery is caused to discharge in a manner that corresponds to a change in the state of the storage battery.

In addition, the battery information may include a chargeable power amount of the storage battery, and the control unit may, when the load power decreases from the first load power to the second load power that is smaller than the first load power, select the first control mode when the chargeable power amount is smaller than a predetermined threshold, and select the second control mode in which the change rate of generation power is set to a value smaller than a value in the first control mode by causing the storage battery to be charged with at least part of power supplied from the power generation unit, when the chargeable power amount is equal to or larger than the threshold.

With this, at least part of power supplied from the power generation unit is charged to the storage battery in the second control mode even when the load power rapidly decreases, and thus the change rate of generation power can be smaller than a change rate of generation power in the first control mode. It is therefore possible to follow a rapid load change without sacrificing a product life of the fuel cell system in the second control mode even when the load power rapidly decreases.

In addition, the fuel cell system may further include a dummy load which consumes power, wherein the control unit may supply surplus power to the dummy load and the storage battery when the second control mode is selected, the surplus power being power exceeding the second load power among the generation power. At this time, the control unit may supply the storage battery with the surplus power which is the power exceeding the second load power among the generation power, after supplying the dummy load with the surplus power, and when supplying the storage battery with the surplus power, supply the storage battery with power, among the surplus power, of an amount equal to or smaller than the chargeable power amount, with reference to the chargeable power amount of the storage battery obtained by the obtaining unit as the battery information.

With this, when the storage battery is charged in the second control mode in the case where the load power rapidly decreases, it is possible to supply power to the storage battery with a power amount equal to or smaller than a chargeable power amount of the storage battery and with a current value equal to or smaller than a maximum chargeable current value, by utilizing power supply to a dummy load. Thus, the change rate of generation power can be further smaller and the storage battery is charged in consideration of a specification of the storage battery.

In addition, when the generation power of the power generation unit is larger than the second load power after the second control mode is selected, the obtaining unit may obtain the chargeable power amount of the storage battery at regular time intervals, and the control unit may select the first control mode when the chargeable power amount obtained at regular time intervals falls below the predetermined threshold.

With this, the power amount equal to or smaller than the chargeable power amount of the storage battery and the maximum chargeable current value are repeatedly monitored at regular time intervals, and the storage battery is charged in a manner that corresponds to a change in the state of the storage battery.

Here, when the control unit selects the second control mode, the change rate of generation power determined by causing the storage battery to charge and/or discharge may be smaller than a maximum change rate of power which has a predetermined impact on a product life of the fuel battery system.

With this, the change rate of generation power in the second control mode is set to a value that does not have an impact on a product life of the fuel cell system. It is therefore possible to avoid reducing the product life of the fuel cell system.

In addition, the battery information may include a state of charge of the storage battery, and when the control unit selects the second control mode, the control unit may cause the storage battery to charge and/or discharge to prevent the state of charge included in the battery information from falling below a power amount necessary for activating the power generation unit.

With this, in the second control mode which utilized charge and/or discharge of the storage battery, the charge and/or discharge of the storage battery is controlled such that the state of charge of the storage battery does not fall below a power amount necessary for activating the power generation unit, and thus it is possible to activate the fuel cell system even when power supply from the power system is stopped due to power failure or the like (in other words, self-sustained operation can be carried out).

In addition, the fuel cell system may further include a connection unit which detachably connects the storage battery with the fuel cell system.

This facilitates replacing of the storage battery connected to the fuel cell system.

In addition, an aspect of a method of controlling a fuel cell system according to the present invention is a method of controlling a fuel cell system which is connected to a storage battery and supplies power to a load, the method including: generating power; obtaining battery information indicating a storage state of the storage battery; and selecting one of a first control mode and a second control mode based on the battery information when load power that is demand power of the load changes from a first load power to a second load power, the first control mode being for supplying power from a power generation unit to the load by causing the power generation unit to generate power without causing the storage battery to charge and/or discharge, the second control mode being for causing the power generation unit to generate power with a change rate of generation power being set to a value smaller than a value in the first control mode, by causing the storage battery to supply power to the load or causing the storage battery to charge and/or discharge in such a manner that the storage battery is charged with at least part of power supplied from the power generation unit, the change rate of generation power being a temporal change in the generation power of the power generation unit.

With this, charge and/or discharge of the storage battery is utilized in the second control mode in the case where the load power changes, and thus the change rate of generation power can be smaller than a change rate of generation power in the first control mode. It is therefore possible to follow a rapid load change without sacrificing a product life of the fuel cell system.

In addition, an aspect of a fuel cell system according to the present invention is a fuel cell system, including: a storage battery; a connection unit connected with the fuel cell system; and a power adjusting unit which performs adjustment for discharging the storage battery or charging the storage battery under a control of the control unit included in the fuel cell system.

This makes it possible to implement a storage battery system which is capable of operating in cooperation with the characteristic fuel cell system according to the present invention.

It is to be noted that the present invention may be implemented not only as the fuel cell system, the method of controlling the fuel cell system, and the storage battery system described above but also as a program causing a processor or a computer to execute the method of controlling, or as a computer-readable recording medium such as a compact disc read only memory (CD-ROM) on which the program is recorded.

(Embodiment)

The following describes in detail an embodiment and modification examples thereof of a fuel cell system, a method for controlling the fuel cell system, and a storage battery system, with reference to the drawings. It is to be noted that each of the embodiment and the modification examples described below shows a preferred example of the present invention. The numerical values, shapes, materials, structural elements, the arrangement and connection of the structural elements, steps, the processing order of the steps, and so on, shown in the following embodiment and the modification examples are mere examples, and therefore do not limit the present invention. The scope of the present invention is indicated by the Claims. Thus, among the structural elements in the following embodiment, structural elements not recited in any one of the independent claims are not necessarily required for achieving the object of the present invention, but described as arbitrary structural elements.

Figure 1:
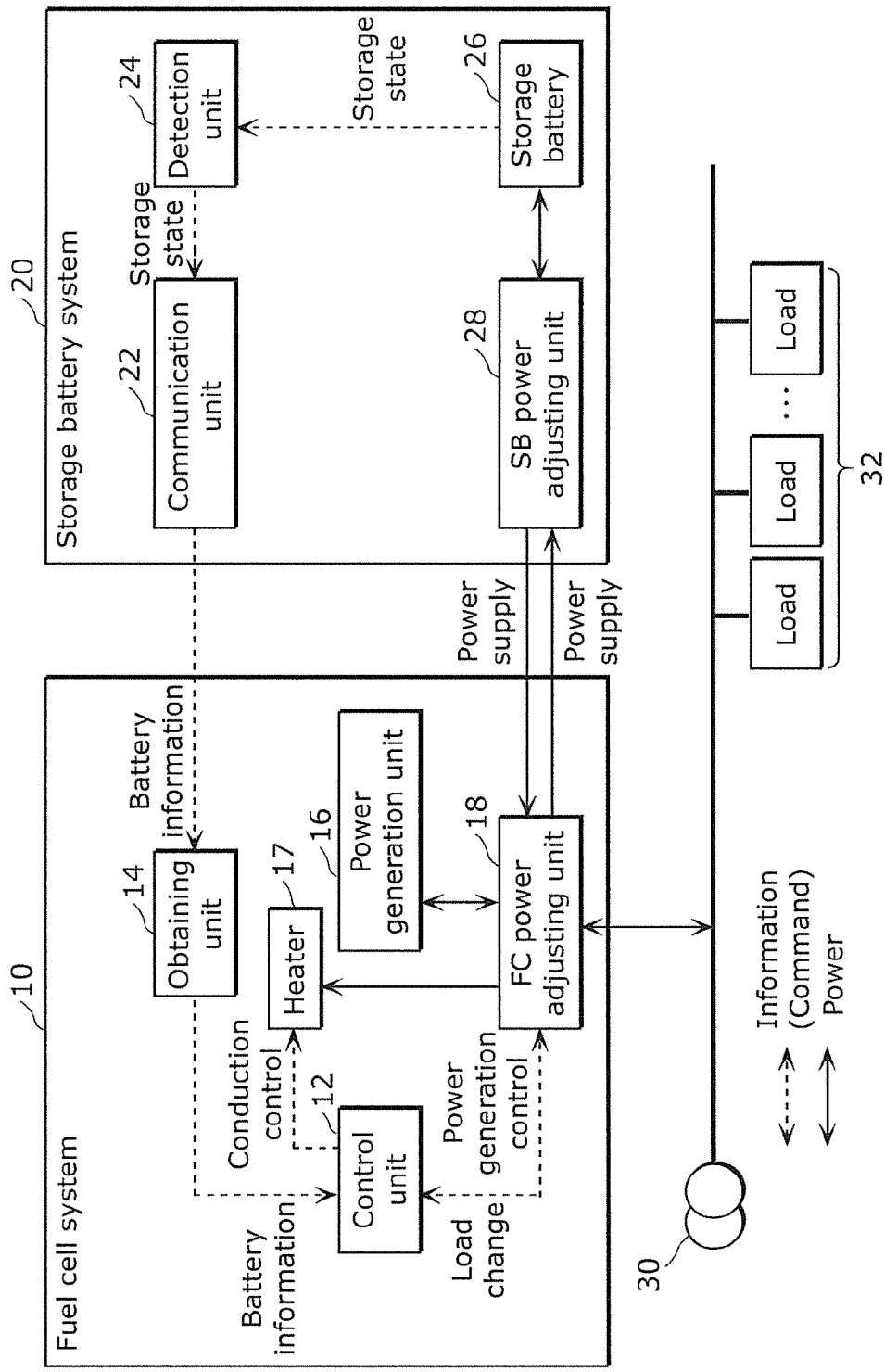
FIG. 1 is a block diagram illustrating a configuration of a fuel cell system according to an embodiment of the present invention.

FIG. 1 is a block diagram illustrating a configuration of a fuel cell system 10 according to the present embodiment. Here, a storage battery system 20 connected to the fuel cell system 10 (in other words, externally disposed) is also illustrated together.

The fuel cell system 10 is a power generation apparatus which is connected to a storage battery (here, the storage battery system 20) and supplies power to a load 32, and includes: a control unit 12; an obtaining unit 14; a power generation unit 16; a heater 17; and a fuel cell (FC) power adjusting unit 18.

It is to be noted that, as to connection between the fuel cell system 10 and the storage battery system 20, the storage battery system 20 is connected to the fuel cell system 10 in a detachable manner via a connection unit (not illustrated) such as a connector and the like mounted on the fuel cell system 10. This facilitates replacing of the storage battery system 20 connected to the fuel cell system 10.

The power generation unit 16 is a device which generates power, and includes a cell stack or the like which generates power in an electrochemical reaction of hydrogen with oxygen.

The FC power adjusting unit 18 is a circuit which is disposed between the storage battery system 20, and the power generation unit 16 and the load, and supplies the load 32 with power by adjusting: generation power of the power generation unit 16; power supplied from the power generation unit 16 to the load 32; power supplied from the power generation unit 16 to the storage battery system 20 (in other words, charge); and power supplied from the storage battery system 20 to the load 32 (in other words, discharge). Thus, the FC power adjusting unit 18 controls the power generation unit 16 and an SB power adjusting unit 28 under the control of the control unit 12, or monitors power (or current) supplied to the load 32.

The obtaining unit 14 is a communication interface or the like which obtains battery information indicating the storage state of the storage battery 26 included in the storage battery system 20. Here, the storage state is a state related to power storage of the storage battery 26, and for example, is at least one of the state of charge, a dischargeable power amount, a chargeable power amount, a maximum chargeable current value, a dischargeable power, a temperature, and a product life of the storage battery 26. The battery information includes information indicating directly or indirectly at least one of the state of charge, the dischargeable power amount, the chargeable power amount, the maximum chargeable current value, the dischargeable power, the temperature, and the product life of the storage battery 26.

Here, the state of charge of the storage battery 26 is the amount of power charged in the storage battery 26 at the point in time. In addition, the dischargeable power amount of the storage battery 26 is an amount of power which can be discharged from the storage battery 26 starting from the point in time. In addition, the chargeable power amount of the storage battery 26 is an amount of power which can be charged into the storage battery 26 starting from the point in time. In addition, the maximum chargeable current value is a maximum value of a current which can be passed through at the point in time in charging of the storage battery 26. In addition, the dischargeable power of the storage battery 26 is a maximum value of power which can be discharged from the storage battery 26 at the point in time. In addition, the product life of the storage battery 26 is a period of time in which the storage battery 26 can be used as a secondary battery or a total number of times of charges and/or discharges, starting from the point in time. In addition, information indirectly indicating the storage state as described above is information which can be a base for deriving the storage state using a predetermined relational expression. For example, as to the state of charge, the dischargeable power amount, and the chargeable power amount, since it is possible to derive two of the parameters based on the other one of the parameters using the predetermined relational expression, the other one of the parameters is information indirectly indicating the other two of the parameters.

The heater 17 is an example of a dummy load, and according to the present embodiment, is an electric heater which heats water in a hot water storage tank that is not illustrated. The heater 17 includes a switch which controls whether or not to receive a power supply from the FC power adjusting unit 18.

The control unit 12 is a controller including a processor or the like, which controls the FC power adjusting unit 18 based on the battery information (the state of charge and so on of the storage battery 26) obtained by the obtaining unit 14, and thereby controls generation power of the power generation unit 16 and charge and/or discharge of the storage battery 26 (more specifically, at least one of (both in the present embodiment) discharge power from the storage battery 26 (or a discharge power amount) and charge power to the storage battery 26 (or a charge power amount)).

More specifically, the control unit 12, when load power that is demand power of the load 32 changes from the first load power to the second load power, selects one of a first control mode and a second control mode based on the battery information obtained by the obtaining unit 14. The first control mode is for supplying power from the power generation unit 16 to the load 32, by causing the power generation unit 16 to generate power without charging and/or discharging the storage battery 26. The second control mode is for causing the power generation unit 16 to generate power with the change rate of the generation power which is a temporal change of generation power of the power generation unit 16 being smaller than a value set in the first control mode, by charging and/or discharging the storage battery 26 so that at least part of the power supplied from the power generation unit 16 is charged to the storage battery 26. At this time, in the case where the control unit 12 selects the second control mode, the change rate of generation power determined by charging and/or discharging the storage battery 26 is smaller than a maximum change rate of power which is a value predetermined as a change rate of power which has a predetermined (to the predetermined extent) impact on the product life of the fuel battery system 10.

For example, when the load power increases from the first load power to the second load power which is larger than the first load power, the control unit 12 selects the first control mode when the dischargeable power amount included in the battery information is smaller than a predetermined threshold, and selects the second control mode which sets the change rate of generation power to be smaller than the value set in the first control mode, by causing the storage battery 26 to supply power to the load 32, when the dischargeable power amount is equal to or larger than the threshold. On the other hand, when the load power decreases from the first load power to the second load power which is smaller than the first load power, the control unit 12 selects the first control mode when the chargeable power amount included in the battery information is smaller than a predetermined threshold, and selects the second control mode which sets the change rate of generation power to be smaller than a value set in the first control mode, by charging at least part of power supplied from the power generation unit 16 to the storage battery 26, when the chargeable power amount is equal to or larger than the threshold.

In addition, when the control unit 12 selects the second control mode, the control unit 12 charges and/or discharges the storage battery 26 so that the state of charge included in the battery information does not fall below the amount of power necessary for activating the power generation unit 16.

It is to be noted that the control unit 12 controls the FC power adjusting unit 18 based on the parameter that has an impact on the product life of the fuel cell system, thereby also enabling control of the generation power of the power generation unit 16. The parameter that has an impact on the product life of the fuel cell system includes at least one of a concentration and a pressure of a hydrogen gas which is in contact with the power generation unit 16, a temperature of the power generation unit 16, and a concentration and a pressure of carbon monoxide which is in contact with the power generation unit 16. In addition, when the FC power adjusting unit 18 cannot supply, to the storage battery 26, surplus power which is a surplus of power generated by the power generation unit 16, the control unit 12 puts a switch in the heater 17 into a conduction state so that the heater 17 can receive power supply from the FC power adjusting unit 18 and is supplied with the surplus power which cannot be supplied by the FC power adjusting unit 18 to the storage battery 26.

The storage battery system 20 is a storage battery apparatus which is connect to the fuel cell system 10 via a connection unit (not illustrated), and performs power transaction with the fuel cell system 10, and includes: a communication unit 22; a detection unit 24; the storage battery 26; and the storage battery (SB) power adjusting unit 28. The storage battery system 20 is used for allowing supply power from the fuel cell system 10 to follow a rapid load change, and supplying power for activating the fuel cell system 10 when power supply from the power system 30 is stopped.

The storage battery 26 is a secondary battery which can be charged and/or discharged.

The detecting unit 24 is a sensor or the like which detects a storage state such as a state of charge and the like of the storage battery 26 described above.

The communication unit 22 is a communication interface or the like which generates battery information indicating a storage state of the storage battery 26 detected by the detecting unit 24, and notifies the generated battery information to the obtaining unit 14 of the fuel cell system 10.

The SB power adjusting unit 28 is connected to the FC power adjusting unit 18 of the fuel cell system 10, and controls charge and/or discharge of the storage battery 26 by adjusting power supplied from the storage battery 26 to the load 32 (in other words, power discharged from the storage battery 26) and power supplied from the power generation unit 16 to the storage battery 26 (in other words, power charged to the storage battery 26). More specifically, the SB power adjusting unit 28 is an example of a power adjusting unit which performs adjustment of causing the storage battery 26 to discharge or causing the storage battery 26 to be charged, under the control of the control unit 12 included in the fuel cell system 10.

It is to be noted that the storage battery system 20 needs to include, as a minimum configuration, only the storage battery 26, the connection unit (not illustrated) connected to the fuel cell system 10, and the SB power adjusting unit 28. This configuration allows performing of the adjustment of causing the storage battery 26 to discharge or causing the storage battery 26 to be charged, under the control of the control unit 12 included in the fuel cell system 10, and thus it is possible to implement the storage battery system which can operate in cooperation with the fuel cell system 10.

Figure 2:
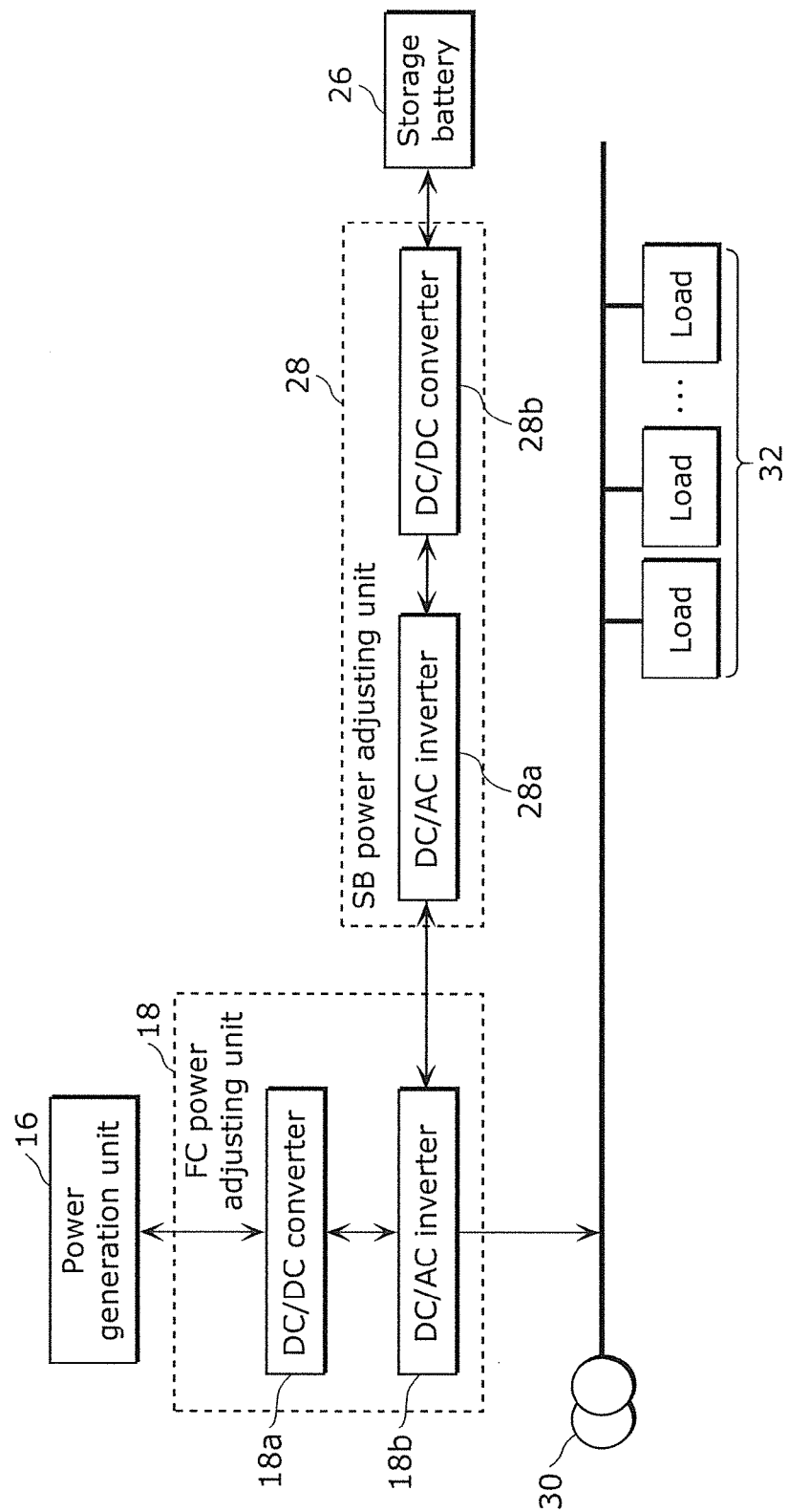
FIG. 2 is a block diagram illustrating an example of a detailed configuration of an FC power adjusting unit and an SB power adjusting unit illustrated in FIG. 1.

FIG. 2 is a block diagram illustrating an example of a detailed configuration of the FC power adjusting unit 18 and the SB power adjusting unit 28 illustrated in FIG. 1.

As illustrated in this diagram, the FC power adjusting unit 18 includes: a DC/DC converter 18a which increases a DC voltage generated by the power generation unit 16, and a DC/AC inverter 18b which converts a DC voltage from the DC/DC converter 18a into an AC voltage. AC power outputted by the DC/AC inverter 18b is supplied to the load 32 and the SB power adjusting unit 28.

In addition, the SB power adjusting unit 28 includes a DC/AC inverter 28a and a DC/DC converter 28b. The DC/AC inverter 28a converts the AC voltage supplied from the FC power adjusting unit 18 (to be exact, the DC/AC inverter 18b) into the DC voltage and outputs the DC voltage to the DC/DC converter 28b, and in reverse, converts the DC voltage supplied from the DC/DC converter 28b into the AC voltage and outputs the AC voltage to the FC power adjusting unit 18. The DC/DC converter 28b decreases a DC voltage supplied from the DC/AC inverter 28a and outputs the decreased DC voltage to the storage battery 26, and in reverse, increases the DC voltage supplied from the storage battery 26 and outputs the increased DC voltage to the DC/AC inverter 28a.

With the fuel cell system 10 and the storage battery system 20 according to the present embodiment, which are configured as described above, characteristic control as described below is performed.

The control unit 12, when load power that is demand power of the load 32 changes from the first load power to the second load power, selects one of the first control mode and the second control mode based on the battery information obtained by the obtaining unit 14. The first control mode is for supplying power from the power generation unit 16 to the load 32, by causing the power generation unit 16 to generate power without charging and/or discharging the storage battery 26. The second control mode is for causing the power generation unit 16 to generate power with the change rate of generation power which is a temporal change of generation power of the power generation unit 16 being set to be smaller than a value set in the first control mode, by causing the storage battery 26 to be charged and/or discharged so that at least part of the power supplied from the power generation unit 16 is charged to the storage battery 26.

As described above, when generation power of the power generation unit 16 changes from the first power to the second power, the control unit 12 of the fuel cell system 10 causes the storage battery system 20 to be charged or to discharge, based on the battery information indicating the storage state such as the state of charge and the like of the storage battery 26, thereby controlling the change rate of generation power that is the temporal change of generation power in a period during which generation power of the power generation unit 16 changes from the first power to the second power. In other words, to address a rapid load change, charging or discharging of the storage battery 26 is utilized so that power outputted by the fuel cell system 10 follows the load 32. With this, even in the case of following a rapid load change, it is possible to prevent surplus power from being wasted, and further to maintain the change rate of generation power of the power generation unit 16 as a constant value (power change at a shallow slope) to prevent the product life of the fuel cell system 10 from being reduced.

In addition, when the control unit 12 selects the second control mode, the control unit 12 causes the storage battery 26 to be charged or to discharge so that the state of charge included in the battery information does not fall below the amount of power necessary for activating the power generation unit 16. In other words, the control unit 12 determines the change rate of generation power of the power generation unit 16 so that the state of charge of the storage battery 26 does not fall below the power amount necessary for activating the fuel cell system 10 in a period during which the generation power of the power generation unit 16 changes from the first power to the second power, and changes the generated power of the power generation unit 16 from the first power to the second power with the determined change rate of generation power. With this, the power amount necessary for activating the fuel cell system 10 is always secured in the storage battery 26, and thus it is possible to receive power supply from the storage battery system 20 to activate the fuel cell system 10 to perform a self-sustained operation even when power supply from the power system 30 is stopped due to power failure or the like.

It is to be noted that, as to charge and/or discharge of the storage battery 26, the control unit 12 determines power to be charged to or discharged from the storage battery 26 based on the change amount of power supplied from the FC power adjusting unit 18 to the load 32 and the battery information such as the state of charge and the like of the storage battery 26, and causes the storage battery 26 to be charged or to discharge with the determined power.

The diagram (a) in FIG. 3 illustrates a flow of power supply to the load 32 in the case where generation power of the power generation unit 16 is not sufficient to meet power required by the load 32, for example, the case where demand power of the load 32 rapidly increases. It is to be noted that, the case where power is not supplied from the power system 30 is illustrated here.

As illustrated in the diagram, when the load power increases from the first load power to the second load power which is larger than the first load power, the control unit 12 selects the first control mode when the dischargeable power amount included in the battery information is smaller than a predetermined threshold, and selects, when the dischargeable power amount is equal to or larger than the threshold, the second control mode which sets the change rate of generation power to be smaller than the value set in the first control mode, by causing the storage battery 26 to supply power to the load 32. More specifically, when the generation power of the power generation unit 16 is not sufficient for following a rapid increase in the demand power of the load 32, power is supplied from the storage battery 26 to the load 32 via the SB power adjusting unit 28 and the FC power adjusting unit 18. In other words, when increasing the generation power of the power generation unit 16 from the first power to the second power which is larger than the first power according to the increase in the demand power of the load 32, the control unit 12 controls the change rate of generation power of the power generation unit 16 so as not to exceed a constant value, by causing the FC power adjusting unit 18 to supply the load 32 with power supplied by the storage battery 26 in a period during which the generation power of the power generation unit 16 changes from the first power to the second power. This makes it possible to prevent deterioration in the product life of the fuel cell system 10 due to a rapid increase in the generation power of the power generation unit 16.

It is to be noted that, in the case where power supply from the storage battery 26 should be stopped because the state of charge of the storage battery 26 comes close to the power amount necessary for activating the fuel cell system 10, or where the demand power of the load 32 exceeds a total of the generation power of the power generation unit 16 and the power which can be supplied from the storage battery 26 due to a significant increase in the demand power of the load 32, power for making up the shortage may be supplied from the power system 30 to the load 32.

For that reason, when the control unit 12 selects the second control mode, the control unit 12 may, with reference to the dischargeable power of the storage battery 26 which is obtained by the obtaining unit 14 as the battery information, cause the storage battery 26 to supply power to the load 32 when a shortage of power which is an amount of shortfall of the generation power of the power generation unit 16 below the second load power, and cause the power system 30 and the storage battery 26 to supply power to the load 32 when the shortage of power is larger than the dischargeable power. At this time, the obtaining unit 14 obtains the dischargeable power of the storage battery 26 at regular time intervals, for the reference performed by the control unit 12. More specifically, the control unit 12 may determine the change rate of generation power of the generation unit 16 so that the state of charge of the storage battery 26 does not fall below the power amount necessary for activating the fuel cell system 10 in the state where the power system 30 supplies power to the load 32, and change the generation power of the generation unit 16 from the first power to the second power with the determined change rate of generation power of the power generation unit 16. In addition, when the generation power of the power generation unit 16 is smaller than the second load power after the second control mode is selected, the obtaining unit 14 may obtain the dischargeable power amount of the storage battery 26 at regular time intervals, and the control unit 12 may select the first control mode when the dischargeable power amount obtained at regular time intervals falls below a predetermined threshold.

41

On the other hand, (b) in FIG. 3 illustrates a flow of power supply from the power generation unit 16 in the case where surplus power is created in the generation power of the power generation unit 16, for example, in the case where the demand power of the load 32 rapidly decreases. It is to be noted that, the case where power is not supplied from the power system 30 is illustrated also in this diagram.

As illustrated in this diagram, when the load power decreases from the first load power to the second load power which is smaller than the first load power, the control unit 12 selects the first control mode when the chargeable power amount included in the battery information is smaller than a predetermined threshold, and selects the second control mode which sets the change rate of generation power to be smaller than a value set in the first control mode, by causing the storage battery 26 to be charged with at least part of power supplied from the power generation unit 16, when the chargeable power amount is equal to or larger than the threshold. In other words, when the generation power of the power generation unit 16 exceeds the demand power of the load 32 due to a rapid decrease in the demand power of the load 32 (in other words, when surplus power is created), the surplus power which results from excluding power supplied to the load 32 from the power generated by the power generation unit 16 is supplied to the storage battery 26 via the FB power adjusting unit 18 and the SB power adjusting unit 28. In other words, when decreasing the generation power of the power generation unit 16 from the first power to the second power which is smaller than the first power according to the decrease in the demand power of the load 32, the control unit 12 controls the change rate of generation power of the power generation unit 16 so as not to exceed a constant value, by causing the FC power adjusting unit 18 to supply the storage battery 26 with the power generated by the power generation unit 16 in a period during which the generation power of the power generation unit 16 changes from the first power to the second power. This makes it possible to prevent deterioration in the product life of the fuel cell system 10 due to a rapid decrease in the generation power of the power generation unit 16, as well as to prevent the surplus power from being wasted.

It is to be noted that, in the case where the load power decreases from the first load power to the second load power which is smaller than the first load power when the control unit 12 selects the second control mode, the surplus power which is power exceeding the second load power among the generation power of the power generation unit 16 and may be supplied to the storage battery 26 after being supplied to the dummy load (the heater 17 in this case). When supplying the surplus power to the storage battery 26, the control unit 12 refers to the chargeable power amount and the maximum chargeable current value of the storage battery 26 obtained by the obtaining unit 14 as the battery information, and thereby supplies the surplus power to the storage battery 26 with a power amount equal to or smaller than the chargeable power amount and a current value equal to or smaller than the maximum chargeable current value. At this time, the obtaining unit 14 obtains the chargeable power amount and the maximum chargeable current value of the storage battery 26 at regular time intervals, for the reference performed by the control unit 12. In other words, when the generation power of the power generation unit 16 is larger than the second load power after the second control mode is selected, the obtaining unit 14 may obtain the dischargeable power amount of the storage battery 26 at regular time intervals, and the control unit 12 may select the first control mode when the dischargeable power amount obtained at regular time intervals falls below a predetermined threshold.

FIG. 4 is a diagram illustrating the state of power supply as a result of the control illustrated in FIG. 3, in this diagram, the horizontal axis indicates time and the vertical axis indicates power. The solid line indicates a temporal change of generation power of the power generation unit 16, and the dashed line indicates a temporal change of the demand power of the load 32 (in other words, the power supplied from the fuel cell system 10 to the load 32). In addition, those hatched portions indicated by positive slopes indicate the temporal change of power (in other words, charge power amount) supplied from the power generation unit 16 to the storage battery 26 (in other words, charge power to the storage battery 26), and those hatched portions indicated by negative slopes indicate the temporal change of power (in other words, discharge power amount) supplied from the storage battery 26 to the load 32 (in other words, discharge power from the storage battery 26).

As illustrated in this diagram, use of discharging from and charging to the storage battery 26 makes it possible to implement power supply in a manner that follows a rapid load change. In addition, the use of discharging from and charging to the storage battery 26 makes it possible to maintain the change rate of generation power of the power generation unit 16 as a constant value (power change at a constant shallow slope), and thus it is possible to prevent deterioration in the product life of the fuel cell system 10. In addition, it is possible to prevent surplus power from being wasted by charging the storage battery 26 with the surplus power.

FIG. 5 is a diagram illustrating a relationship between the state of charge of the storage battery 26 and the change rate of generation power of the power generation unit 16. In other words, an example of how the change rate of generation power is controlled according to the state of charge by the control unit 12 is illustrated here.

The diagram (a) in FIG. 5 illustrates three cases (1) to (3) which relate to the state of charge of the storage battery 26. The cases (1) to (3) correspond to the cases where the state of charge of the storage battery 26 is: larger than three-quarters; larger than a half and smaller than or equal to three-quarters; and smaller than or equal to a half, of a power amount when the storage battery 26 is fully charged, respectively.

The diagram (b) in FIG. 5 illustrates an example of the change rate of generation power of the power generation unit 16 in those three cases (1) to (3) of the state of charge illustrated in (a) in FIG. 5.

As can be seen from FIG. 5, when the demand power of the load 32 increases, the control unit 12 controls the FC power adjusting unit 18 so that the change rate of generation power of the power generation unit 16 has: the smallest value among the three cases in the case (1); a middle value of the three cases in the case (2); and the largest value among the three cases in the case (3).

Meanwhile, as to discharging of the storage battery 26 carried out at the same time, the control unit 12 controls the FC power adjusting unit 18 so that the supply power (discharge power) from the storage battery 26 to the load 32 has: the largest value among the three cases in the case (1); a middle value of the three cases in the case (2); and a zero value in the case (3).

More specifically, when the demand power of the load 32 increases, the control unit 12 determines that the power amount necessary for activating the fuel cell system 10 is approximately a half of the power amount of the fully charged storage battery 26, and controls the change rate of generation power of the power generation unit 16 and the discharge power from the storage battery 26 so that the state of charge of the storage battery 26 does not fall below a half and a total of the generation power of the power generation unit 16 and the dischargeable power of the storage battery 26 is the demand power (load power) of the load 32.

In the same manner as above, when the demand power of the load 32 decreases, the control unit 12 controls the FC power adjusting unit 18 so that the change rate of generation power (change rate of power as an absolute value) of the power generation unit 16 has: the largest value among the three cases in the case (1); a middle value of the tree cases in the case (2); and the smallest value among the three cases in the case (3).

Meanwhile, as to charging of the storage battery 26 carried out at the same time, the control unit 12 controls the FC power adjusting unit 18 so that: the supply power (charge power) from the power generation unit 16 to the storage battery 26 has the smallest value (or a zero value) among the three cases in the case (1); the supply power (discharge power) from the storage battery 26 to the load 32 has a middle value of the three cases in the case (2); and the supply power (charge power) from the power generation unit 16 to the storage battery 26 has the largest value among the three cases in the case (3).

More specifically, when the demand power of the load 32 decreases, the control unit 12 determines that the power amount necessary for activating the fuel cell system 10 is approximately a half of the power amount of the fully charged storage battery 26, and controls the change rate of generation power of the power generation unit 16 and the charge power to the storage battery 26 so that the state of charge of the storage battery 26 does not fall below a half and a surplus power which results from excluding the demand power of the load 32 from the generation power of the power generation unit 16 is supplied to the storage battery 26.

As described above, when the generation power of the power generation unit 16 increases, the control unit 12 increases the generation power of the power generation unit 16 at a predetermined reference increase rate when the load 32 is not supplied with power from the storage battery 26 (in the first control mode), and on the other hand, increases the generation power of the power generation unit 16 at a change rate of generation power smaller than the reference increase rate by causing the storage battery 26 to discharge when the load 32 is supplied with power from the storage battery 26 (in the second control mode). In other words, when the fuel cell system 10 receives power supply from the storage battery 26 (in the second control mode), the control unit 12 changes the generation power or the power generation unit 16 from the first power to the second power, taking a period of time longer than a period of time taken in the case of changing the power generated by the power generation unit 16 at the reference increase rate.

In addition, when the generation power of the power generation unit 16 decreases, the control portion 12 decreases the generation power of the power generation unit 16 at a predetermined reference decrease rate in the case where the power generated by the power generation unit 16 is not supplied to the storage battery 26 (in the first control mode), and on the other hand, decreases the generation power of the power generation unit 16 at a change rate of generation power smaller than the reference decrease rate, by supplying the storage battery 26 with surplus power among the power generated by the power generation unit 16, when the power generated by the power generation unit 16 is supplied to the storage battery 26 (in the second control mode). In other words, when the generation power of the power generation unit 16 is supplied to the storage battery 26 (in the second control mode), the control unit 12 changes the generation power of the power generation unit 16 from the first power to the second power, taking a period of time longer than a period of time taken in the case of changing the power generated by the power generation unit 16 at the reference decrease rate.

According to the control described above, when it is possible to cause the storage battery 26 to be charged and/or discharged (in the second control mode), power supply that follows a rapid load change is implemented and the change rate of generation power of the power generation unit 16 is maintained at a constant value (power change at a constant shallow slope) by utilizing discharging from and charging to the storage battery 26, and thus it is possible to prevent deterioration in the product life of the fuel cell system 10. In addition, at least the power amount necessary for activating the fuel cell system 10 is secured in the storage battery 26 as the state of charge, and thus it is possible to activate the fuel cell system 10 perform a self-sustained operation by receiving the power supply from the storage battery 26 even when power supply from the power system is stopped due to power failure or the like. In addition, it is possible to prevent surplus power from being wasted by charging the storage battery 26 with the surplus power.

It is to be noted that, although the power amount necessary for activating the fuel cell system 10 is controlled as a half of the power amount at the time when the storage battery 26 is fully charged in the example illustrated in FIG. 5, the power amount which belongs to a range from one third to two thirds of the dischargeable power amount at the time when the storage battery 26 is fully charged is typically sufficient. In other words, the relationship between the power amount necessary for activating the fuel cell system 10 and the dischargeable power amount at the time when the storage battery 26 is fully charged can be arbitrarily determined taking into consideration a size of the fuel cell system 10, a capacity of the storage battery 26, and so on.

Next, operations of the fuel cell system 10 configured as described above according to this embodiment will be described.

FIG. 6 is a flowchart illustrating a basic operation of the fuel cell system 10 according to this embodiment. Here, the operation procedure of the control unit 12 in the fuel cell system 10 when load power changes from the first load power to the second load power is illustrated.

First, the obtaining unit 14 obtains battery information of the storage battery 26 from the storage battery system 20 (S50).

The control unit 12, based on the storage state of the storage battery 26 indicated by the battery information obtained by the obtaining unit 14 (S51), selects the first control mode in which power is supplied to the load 32 from the power generation unit 16 by causing the power generation unit 16 to generate power without causing the storage battery 26 to be charged or to discharge (S52), or selects the second control mode in which the power generation unit 16 is caused to generate power with the change rate of generation power R2 which is a temporal change of generation power of the power generation unit 16 being set to be smaller than a change rate of generation power R1 which is set in the first control mode, by causing the storage battery 26 to be charged or to discharge so that the load 32 is supplied with power by the storage battery 26 or at least part of the power supplied from the power generation unit 16 is charged to the storage battery 26 (S53). Then, the control unit 12 performs control in the selected control mode.

For example, when the load power increases from the first load power to the second load power which is larger than the first load power, the control unit 12 selects the first control mode when the dischargeable power amount included in the battery information is smaller than a predetermined threshold Th1, and selects the second control mode which sets the change rate of generation power to be smaller than the value set in the first control mode, by causing the storage battery 26 to supply power to the load 32, when the dischargeable power amount is equal to or larger than the threshold Th1.

In addition, when the load power decreases from the first load power to the second load power which is smaller than the first load power, the control unit 12 selects the first control mode when the chargeable power amount included in the battery information is smaller than a predetermined threshold Th2, and on the other hand, selects the second control mode which sets the change rate of generation power to be smaller than a value set in the first control mode, by causing the storage battery 26 to be charged with at least part of power supplied from the power generation unit 16, when the chargeable power amount is equal to ore larger than the threshold Th2.

According to the control described above, when it is possible to cause the storage battery 26 to be charged and/or discharged (in the second control mode), the use of discharging from and/or charging to the storage battery 26 makes it possible to implement power supply that follows a rapid load change, and to maintain the change rate of generation power of the power generation unit 16 at a constant value (power change at a constant shallow slope), and thus it is possible to prevent deterioration in the product life of the fuel cell system 10.

FIG. 7A is a flowchart illustrating an operation of the fuel cell system 10 related to use of the power system 30 in the second control mode. Here, the operation procedure of the control unit 12 in the fuel cell system 10 when load power changes from the first load power to the second load power which is larger than the first load power is illustrated.

First, the control unit 12 determines whether or not power is supplied to a dummy load (the heater 17 in this case) (S60), and when it is determined that power is supplied, power supply to the dummy load (the heater 17 in this case) is stopped by controlling the FC power adjusting unit 18 (S61).

Next, the obtaining unit 14 obtains battery information including the dischargeable power of the storage battery 26, from the storage battery system 20 (S62).

Then, the control unit 12 refers to the dischargeable power of the storage battery 26 obtained by the obtaining unit 14, thereby determining whether or not the generation power of the power generation unit 16 is larger than a shortage of power which is an amount of shortfall of the generation power of the power generation unit 16 below the second load power (S63).

As a result, when the shortage of power is larger than the dischargeable power (Yes in S63), the control unit 12 causes the load 32 to be supplied with the power supplied from the storage battery 26 and the power supplied from the power system 30 (S64 and S65), and on the other hand, when the shortage of power is equal to or smaller than the dischargeable power (No in S63), the control unit 12 causes the storage battery to supply power to the load 32 (S66).

With this, when the load power rapidly increases, power for making up the shortage is automatically supplied from the power system 30 to the load 32, making it possible to maintain the change rate of generation power of the power generation unit 16 as a constant value (power change at a constant shallow slope), and thus it is possible to prevent deterioration in the product life of the fuel cell system 10.

FIG. 7B is a flowchart illustrating an operation of the fuel cell system 10 related to use of the dummy load in the second control mode. Here, the operation procedure of the control unit 12 in the fuel cell system 10 when load power changes from the first load power to the second load power which is smaller than the first load power is illustrated.

First, the control unit 12 supplies the dummy load (the heater 17 in this case) with surplus power which is power exceeding the second load power among the generation power of the power generation unit 16 (S70).

Next, the obtaining unit 14 obtains battery information including the chargeable power amount and the maximum chargeable current value of the storage battery 26, from the storage battery system 20 (S71).

Then, the control unit 12 refers to the chargeable power amount and the maximum chargeable current value of the storage battery 26 obtained by the obtaining unit 14 as the battery information, and thereby determines whether or not the surplus power can be supplied to the storage battery 26 (S72). For example, the control unit 12 determines whether or not the chargeable power amount of the storage battery 26 is equal to or larger than a predetermined value and the maximum chargeable current value is equal to or larger than a predetermined value (in other words, whether or not the storage battery 26 can be charged).

As a result, when it is determined that the surplus power can be supplied to the storage battery 26 (Yes in S71), the control unit 12 supplies the surplus power to the storage battery 26 as the second control mode (S73) after supplying the surplus power to the dummy load (the heater 17 in this case) or without performing such supply, and when it is determined that the surplus power cannot be supplied to the storage battery 26 (No in S71), the control unit 12 supplies the surplus power only to the dummy load (the heater 17 in this case) as the first control mode (S74).

With this, since the surplus power is supplied to the dummy load (the heater 17 in this case), power is effectively utilized and the change rate of generation power of the power generation unit 16 is maintained as a constant value (power change at a constant shallow slope), and thus it is possible to prevent deterioration in the product life of the fuel cell system 10.

FIG. 8A is a flowchart illustrating an operation of the fuel cell system 10 in the case where demand power of the load 32 increases. FIG. 9 is a flowchart illustrating an operation of the fuel cell system 20 in a similar case.

In the fuel cell system 10, as illustrated in FIG. 8A, the obtaining unit 14 first obtains, via the communication unit 22, battery information (battery information indicating the state of charge detected by the detection unit 24 according to this embodiment) related to the storage state of the storage battery 26 at this point in time (S10).

Next, the control unit 12 collects power supplied to the load 32 ("load change" in FIG. 1) from the FC power adjusting unit 18 (S11), and thereby determines whether or not the supply power to the load 32 has increased from the supply power immediately before by equal to or larger than a certain value (S12). In other words, the control unit 12 determines whether or not the demand power of the load 32 is on the increase. This determination is repeated until the supply power to the load 32 increases (No in S12).

When it is determined that the supply power to the load 32 has increased (Yes in S12), the control unit 12 determines the change rate of generation power of the power generation unit 16 with reference to a table illustrated in (b) in FIG. 5 and the like based on the battery information obtained by the obtaining unit 14, and further determines, as the discharge power of the storage battery 26, a shortage of power resulting from subtracting generation power of the power generation unit 16 from the demand power (load power) of the load 32 (S13). The details of Step S13 will be described later with reference to FIG. 8B.

The control unit 12 controls the SB power adjusting unit 28 and the power generation unit 16 via the FC adjusting unit 18 so that the determined discharge power of the storage battery 26 and the change rate of generation power of the power generation unit 16 are obtained (S14 and S15). As a result, the FC power adjusting unit 18 supplies the load 32 with power supplied by the storage battery 26 with the determined discharge power, and supplies the load 32 with power supplied by the power generation unit 16 which generates power at the determined change rate of generation power.

The control unit 12 determines whether or not a total of the generation power of the power generation unit 16 and the dischargeable power of the storage battery system 20 can meet the demand power of the load 32 (load power) (S16).

When it is determined that the total does not meet the demand power (No in S16), the power system 30 automatically supplies the load 32 with power for making up the shortage (in other words, the load 32 is automatically supplied with power for making up the shortage from the power system 30) (S17).

On the other hand, in the storage battery system 20, the detecting unit 24 first detects the storage state such as the state of charge of the storage battery 26 as illustrated in FIG. 9 (S20).

Then, the communication unit 22 generates battery information indicating the storage state of the storage battery 26 detected by the detecting unit 24, and notifies the generated battery information to the obtaining unit 14 of the fuel cell system 10.

Lastly, the SB power adjusting unit 28 causes the storage battery 26 to discharge according to a request from the FC power adjusting unit 18 (instruction of discharge power), and outputs the discharge power to the FC power adjusting unit 18 (S22).

With the control descried above, when the demand power of the load 32 increases, it is possible to implement power supply that follows a load change without rapidly increasing generation power of the power generation unit 16, by utilizing discharging of the storage battery 26.

It is to be noted that, although the discharge power of the storage battery 26 and the change rate of generation power of the power generation unit 16 are determined based on the state of charge of the storage battery 26 in the control example described above, the discharge power of the storage battery 26 and the change rate of generation power of the power generation unit 16 may be determined, instead, based on the dischargeable power amount of the storage battery 26. Since one of the state of charge and the dischargeable power amount of the storage battery 26 can be calculated from the other, either control may be employed.

Here, the details of Step S13 illustrated in FIG. 8A is explained with reference to FIG. 8B.

According to this embodiment, the control unit 12 determines an increase rate of power generation of the power generation unit 16 in consideration of a parameter which has an impact on the product life of the fuel cell system. Next, the control unit 12 determines discharge power from the storage battery system 20 to the load 32 based on the state of charge of the storage battery system 20. It is to be noted that, an example in which the parameter which has an impact on the product life of the fuel cell system 10 indicates the concentration of a hydrogen gas will be employed for the explanation below.

FIG. 8B is a flowchart illustrating the processing which determines the increase rate of the generation power of the power generation unit 16 (in other words, an increase rate of power generation) and the discharge power from the storage battery system 20, when increasing supply power from the fuel cell system 10 to the load 32.

The control unit 12 determines whether or not power can be generated at a reference increase rate, in consideration of the parameter indicating the state of a hydrogen gas in contact with the power generation unit (for example, the concentration of hydrogen gas) (S701). The parameters which have an impact on the product life of the fuel cell system 10 include, in addition to the parameter indicating the state of a hydrogen gas: a parameter indicating the state of a temperature of the power generation unit 16; a concentration of carbon monoxide; a pressure of hydrogen in contact with the power generation unit 16; and so on. In other words, the parameter that has an impact on the product life of the fuel cell system 10 includes at least one of the concentration and the pressure of a hydrogen gas which is in contact with the power generation unit 16, a temperature of the power generation unit 16, and a concentration and a pressure of carbon monoxide which is in contact with the power generation unit 16.

Next, when it is determined that power can be generated at the reference increase rate (Yes in S701), for example, when the hydrogen concentration is a predetermined hydrogen concentration suitable for the power generation unit 16 to generate power, the control unit 12 determines the increase rate of power generation as a reference increase rate (S702). The reference increase rate is a power increase rate necessary for the fuel cell system 10 to achieve a predetermined product life. For example, 1 W/SEC is used as the reference increase rate.

Next, when it is not determined that power can be generated at the reference increase rate (No in S701), for example, when the hydrogen concentration is not a hydrogen concentration suitable for the power generation unit 16 to generate power, the control unit 12 determines to set the increase rate of power generation to be smaller than the reference increase rate (S703). In some cases, the product life of the fuel cell system 10 deteriorates when power is generated at the reference increase rate in spite of the fact that the concentration of hydrogen is not the concentration of hydrogen suitable for generating power by the power generation unit 16. In this case, it is possible to prevent deterioration of the product life of the fuel cell system 10 by generating power at an increase rate of power generation smaller than the reference increase rate.

In addition, control is performed in the same manner on the parameter indicating the state of temperature of the power generation unit 16, the concentration of carbon monoxide, the pressure of the power generation unit, and the like. In other words, when the parameter is within a range suitable for performing power generation by the power generation unit 16, the increase rate of power generation is set to the reference increase rate. When the parameter is outside the range suitable for performing power generation by the power generation unit 16, the increase rate of power generation is set to a value smaller than the reference increase rate. With this, it is possible to prevent deterioration in the product life of the fuel cell system 10.

Next, the control unit 12 determines whether or not the state of charge of the storage battery system 20 is equal to or larger than the power amount necessary for activating the fuel cell system 10 (S704). When the state of charge of the storage battery system 20 is equal to or smaller than the power amount necessary for activating the fuel cell system 10 (Yes in S704), the control unit 12 determines to set the increase rate of power generation of the power generation unit 16 to the reference increase rate, and the discharge power from the storage battery system 20 to zero (S702). With this, the storage battery system 20 is capable of retaining the power amount necessary for activating the fuel cell system 10, and thus the storage battery system 20 is capable of supplying the power amount necessary for activating the fuel cell system 10 even when power supply from the power system 30 is stopped. The fuel cell system 10 is capable of being activated by receiving supply of the power amount necessary for activating the fuel cell system 10 even when power supply from the power system 30 is stopped due to a power failure or the like.

On the other hand, when the state of charge of the storage battery system 20 is larger than the power amount necessary for activating the fuel cell system 10 (No in S704), the control unit 12 determines the increase rate of power generation of the power generation unit 16 and the discharge power from the storage battery system 20 to the load 32 (S705). This increases the possibility that the fuel cell system 10 and the storage battery system 20 can supply the load 32 with power required by the load 32 by discharging power from the storage battery system 20 to the load 32 even when the generation power of the power generation unit 16 is not sufficient.

It is to be noted that, when the parameter that has an impact on the product life of the fuel cell system 10 is outside the range suitable for power generation by the power generation unit 16, it may be determined that generation power is increased taking a period of time longer than a period of time taken when the generation power is increased at the reference increase rate, instead of determining the increase rate of power generation to be set to a value smaller than a reference increase rate. The product life of the fuel cell system 10 is reduced in some cases when generation power is increased in a length of time same as a length of time when increasing the generation power at the reference increase rate, in spite of the fact that the parameter that has an impact on the product life of the fuel cell system 10 is outside the range suitable for power generation performed by the power generation unit 16. In this case, it is possible to prevent reduction in the product life of the fuel cell system 10, by increasing the generation power taking a period of time longer than a period of time taken when generation power is increased at the reference increase rate.

The following describes an operation of the fuel cell system 10 the case where the demand power of the load 32 decreases, FIG. 10A is a flowchart illustrating an operation of the fuel cell system 10 in the case where the demand power of the load 32 decreases, FIG. 11 is a flowchart illustrating an operation of the fuel cell system 20 in a similar case.

In the fuel cell system 10, as illustrated in FIG. 10A, the obtaining unit 14 first obtains, via the communication unit 22, battery information (battery information indicating the state of charge detected by the detection unit 24 according to this embodiment) related to the storage state of the storage battery 26 at this point in time (S30).

Next, the control unit 12 collects power supplied to the load 32 ("load change" in FIG. 1) from the FC power adjusting unit 18 (S31), and thereby determines whether or not the supply power to the load has decreased from the supply power immediately before by equal to or larger than a certain value (S32). In other words, the control unit 12 determines whether or not the demand power of the load is on the decrease. This determination is repeated until the supply power to the load 32 decreases (No in S32).

When it is determined that the supply power to the load 32 decreases (Yes in S32), the control unit 12 determines the change rate of generation power of the power generation unit 16 with reference to the table illustrated in (b) in FIG. 5 and the like, based on the battery information obtained by the obtaining unit 14, and further determines the surplus power resulting from subtracting the demand power of the load 32 from the generation power of the power generation unit 16 as charge power (S33). The details of the control in Step S33 will be explained later with reference to FIG. 10B.

The control unit 12 controls the SB power adjusting unit 28 and the power generation unit 16 via the FC adjusting unit 18 so that the determined discharge power of the storage battery 26 and the change rate of generation power of the power generation unit 16 are obtained (S34 and S35). As a result, the FC power adjusting unit 18 supplies the storage battery 26 with the determined surplus power supplied from the power generation unit 16, and supplies the load 32 with the demand power out of the power generated by the power generation unit 16 at the determined change rate of generation power.

The control unit 12 determines whether or not all of the surplus power among the generation power of the power generation unit 16 can be charged to the storage battery system 20 (S36). When it is not possible to charge all the surplus power (No in S36), the control unit 12 turns ON a switch provided in the heater 17 to control the heater 17 so that the surplus power, that is the power which cannot be charged to the storage battery system 20 among the generation power, is supplied from the FC power adjusting unit 18 to the heater 17 (S37). When receiving power supply, the heater 17 is capable of converting the power into thermal energy and storing the thermal energy. Thus, it is possible to effectively utilize power.

On the other hand, in the storage battery system 20, the detecting unit 24 first detects the storage state such as the state of charge of the storage battery 26 and so on, as illustrated in FIG. 11 (S40).

Then, the communication unit 22 generates battery information indicating the storage state of the storage battery 26 detected by the detecting unit 24, and notifies the generated battery information to the obtaining unit 14 of the fuel cell system 10 (S41).

Lastly, the SB power adjusting unit 28 receives power outputted from the FC power adjusting unit 18 (in other words, surplus power) and supplies the power to the storage battery 26 ((in other words, charges) (S42).

Here, the details of Step S33 illustrated in FIG. 10A is explained with reference to FIG. 10B.

According to this embodiment, the control unit 12 determines an decrease rate of power generation of the power generation unit 16 in consideration of a parameter which has an impact on the product life of the fuel cell system. Next, the control unit 12 determines charge power from the fuel cell system 10 to the storage battery system 20 based on the state of charge of the storage battery system 20. It is to be noted that, an example in which the parameter which has an impact on the product life of the fuel cell system 10 indicates the concentration of a hydrogen gas will be employed for the description below.

FIG. 10B is a flowchart illustrating processing of determining the decrease rated of the generation power of the power generation unit 16 and the charge power to the storage battery system 20, in the case where supply power from the fuel cell system 10 to the load 32 is caused to decrease.

The control unit 12 determines whether or not power can be generated at a reference increase rate, in consideration of the parameter indicating the state of a hydrogen gas in contact with the power generation unit 16 (for example, the concentration of a hydrogen gas) (S901). The parameters which have an impact on the product life of the fuel cell system 10 include, in addition to the parameter indicating the state of a hydrogen gas: a parameter indicating the state of a temperature of the power generation unit 16; a concentration of carbon monoxide; a pressure of hydrogen in contact with the power generation unit 16; and so on.

Next, when it is determined that power can be generated at the reference increase rate (Yes in S901), for example, when the hydrogen concentration is a predetermined hydrogen concentration suitable for the power generation unit 16 to generate power, the control unit 12 determines the decrease rate of power generation as the reference increase rate (S902). The reference decrease rate is a power decrease rate necessary for the fuel cell system 10 to achieve a predetermined product life. For example, 2 W/SEC is used as the reference decrease rate.

Next, when it is not determined that power can be generated at the reference decrease rate (No in S901), for example, when the hydrogen concentration is not a suitable hydrogen concentration for the power generation unit 16 to generate power, the control unit 12 determines to set the decrease rate of power generation to be smaller than the reference decrease rate (S903). In some cases, the product life of the fuel cell system 10 deteriorates when power is generated at the reference decrease rate, in spite of the fact that the concentration of hydrogen is not the concentration of hydrogen suitable for generating power by the power generation unit 16. In this case, it is possible to prevent deterioration in the product life of the fuel cell system 10, by generating power at a decrease rate of power generation smaller than the reference decrease rate.

In addition, control is also performed in the same manner on the parameter indicating the state of temperature of the power generation unit 16, the concentration of carbon monoxide, the pressure of the power generation unit, and the like. In other words, when the parameter is within a range suitable for power generation performed by the power generation unit 16, the decrease rate of power generation is set to the reference decrease rate. When the parameter is outside the range suitable for power generation performed by the power generation unit 16, the decrease rate of power generation is set to a value smaller than the reference decrease rate. With this, it is possible to prevent deterioration in the product life of the fuel cell system 10.

Next, the control unit 12 determines whether or not the state of charge of the storage battery system 20 indicates full charge. When the state of charge of the storage battery system 20 is full charge (Yes in S904), the decrease rate of power generation of the power generation unit 16 is set to the reference decrease rate, and the charge power to the storage battery system 20 is set to zero (S902). With this, it is possible to prevent the storage battery system 20 from being charged when the storage battery system 20 is fully charged.

On the other hand, when the state of charge of the storage battery system 20 is not full charge (No in S904), the control unit 12 determines the decrease rate of power generation of the power generation unit 16 and the charge power to the storage battery system 20 (S905). It is possible to store power by charging power generated in the fuel cell system 10 to the storage battery system 20.

As described above, the control unit 12 determines the decrease rate of power generation and the charge power to the storage battery, in consideration of both of the product life of the fuel cell system and the state of charge of the storage battery in this order of priority. It is therefore possible to increase the product life of the fuel cell system 10 by giving the highest priority to the product life of the fuel cell system 10. It is possible, by taking the state of charge of the storage battery into consideration next, to maximize the charge amount of the storage battery (state of charge) within a range in which an adverse current does not occur.

It is to be noted that, when the parameter that has an impact on the product life of the fuel cell system 10 is outside the range suitable for power generation performed by the power generation unit 16, generation power may be decreased taking a period of time longer than a period of time taken when generation power is decreased at the reference decrease rate, instead of setting the decrease rate of power generation to a value smaller than the reference decrease rate. The product life of the fuel cell system 10 is reduced in some cases when power generation is decreased in a length of time same as a length of time when decreasing the power generation at the reference decrease rate even when the parameter that has an impact on the product life of the fuel cell system 10 is outside the range suitable for power generation performed by the power generation unit 16. In this case, it is possible to prevent deterioration in the product life of the fuel cell system 10, by decreasing the power generation taking a period of time longer than a period of time taken when generation power is decreased at the reference decrease rate.

With the control descried above, when the demand power of the load 32 decreases, it is possible to implement power supply that follows a load change without rapidly decreasing generation power of the power generation unit 16, by utilizing charging to the storage battery 26.

It is to be noted that, although the charge power to the storage battery 26 and the change rate of generation power of the power generation unit 16 are determined based on the state of charge of the storage battery 26 in the control example described above, the charge power to the storage battery 26 and the change rate of generation power of the power generation unit 16 may be determined, instead, based on the chargeable power amount of the storage battery 26. Since one of the state of charge and the chargeable power amount of the storage battery 26 can be calculated from the other, either control may be employed.

In addition, the control described in FIG. 8A and FIG. 10A are executed alternately or in parallel in the fuel cell system 10, and the control described in FIG. 9 and FIG. 11 are executed alternately or in parallel in the storage battery system 20.

FIG. 12 is a block diagram illustrating a configuration of a fuel cell system 10*a* according to a first modification example of the above-described embodiment.

The fuel cell system 10a is a fuel cell system including a storage battery (a storage battery unit 20a, in this case) connected via a connection unit such as a connector described above, and includes a control unit 12a, the power generation unit 16, the FC power adjusting unit 18, and the storage battery unit 20a. The storage battery unit 20a includes the detecting unit 24, the SB power adjusting unit 28, and the storage battery 26.

The fuel cell system 10a is different from the fuel cell system 10 according to the above-described embodiment only in that the fuel cell system 10a does not include the obtaining unit 14 (in other words, functions of the obtaining unit 14 is included in the control unit 12a) and that the fuel cell system 10a includes the storage battery unit 20a. In addition, the storage battery unit 20a is different from the storage battery system 20 according to the above-described embodiment only in that the storage battery unit 20a does not includes the communication unit 22 (in other words, functions of the communication unit 22 is included in the detecting unit 24). The constituent elements same as those in the above-described embodiment will be assigned with the same reference numerals and description for them will be omitted, and the following describes the differences.

In this Modification, since the storage battery unit 20a is included in the fuel battery system 10a, the control unit 12a directly communicates (exchanges information) with the detecting unit 24 and the SB power adjusting unit 28. In other words, the control unit 12a has the function of an obtaining unit which obtains battery information that is related to a storage state of the storage battery 26 and is detected by the detecting unit 24.

It is to be noted that, although not illustrated, the control unit 12a may directly notify the SB power adjusting unit 28 of an instruction related to the determined discharge power amount of the storage battery 26 ("power supply instruction") or may directly obtain information related to power amount that the storage battery 26 can supply (discharge) (dischargeable power amount) from the SB power adjusting unit 28, when the demand power of the load 32 increases.

As described above, according to the present modification, the fuel cell system 10a and the storage battery unit 20a are directly connected by an internal line or the like via the connection unit, and directly exchange information with each other without a communication interface or the like. It is to be noted that the methods of determining the change rate of generation power of the power generation unit 16 and the power amount of charge and/or discharge of the storage battery 26 are the same as those described in the above embodiment.

FIG. 13 is a block diagram illustrating a configuration of a fuel cell system 10b according to a second modification example of the above-described embodiment. Here, a power generation system including a fuel cell system 10b, the storage battery system 20, and a control apparatus 34 is illustrated.

The control apparatus 34 is a centralized controller which controls the fuel cell system 10b and the storage battery system 20 by exchanging information between the fuel cell system 10b and the storage battery system 20.

The fuel cell system 10b includes: an FC control unit 12b; the power generation unit 16; the FC power adjusting unit 18; and the communication unit 19. The storage battery unit 20 includes the detecting unit 24, the SB power adjusting unit 28, and the storage battery 26. The fuel cell system 10b is different from the fuel cell system 10 according to the above-described embodiment only in that the communication unit 19 is included instead of the obtaining unit 14, and that the FC control unit 12b is included instead of the control unit 12. In addition, the storage battery system 20 is equivalent to that in the above-described embodiment. The constituent elements same as those in the above-described embodiment will be assigned with the same reference numerals and description for them will be omitted, and the following describes the differences.

In the present modification, the functions of the control unit 12 according to the above-described embodiment are held separately in the control apparatus 34 and the FC control unit 12b. More specifically, among the functions of the control unit 12 according to the above-described embodiment, the processes of determining the change rate of generation power of the power generation unit 16 and the discharge power or the charge power of the storage battery 26 (S10 to S13 in FIG. 8, and S30 to S33 in FIG. 10A) are performed by the control apparatus 34.

In other words, the state of charge of the storage battery 26 detected by the detecting unit 24 is notified to the control apparatus 34 via the communication unit 22, the load change is notified to the control apparatus 34 via the FC power adjusting unit 18, the FC control unit 12b and the communication unit 19, the control apparatus 34 determines increase or decrease of the load, the change rate of generation power of the power generation unit 16, and the discharge power or charge power of the storage battery 26.

Then, the change rate of generation power determined in the control apparatus 34 is notified by the control apparatus 34 to the FC control unit 12b via the communication unit 19, and the FC control unit 12b controls the power generation unit 16 via the FC power adjusting unit 18 in order to implement the change rate of generation power.

On the other hand, the discharge power or the charge power of the storage battery 26 which is determined in the control apparatus 34 is notified by the control apparatus 34 to the SB power adjusting unit 28 via the communication unit 22, and the SB power adjusting unit 28 performs power adjustment so that the notified discharge power is supplied from the storage battery 26 or the notified charge power is supplied to the storage battery 26.

As described above, with the power generation system according to the present modification, the fuel battery system 10b and the storage battery system 20 operate under the control of the control apparatus 34, and thereby the change rate of generation power of the power generation unit 16 is maintained at a constant value by utilizing charge and/or discharge of the storage battery 26, making it possible to implement power supply that follows a rapid load change without deteriorating the product life of the fuel cell system 10.

It should be noted that although the fuel cell system, method for controlling the fuel cell system, and the storage battery system according to the present invention are described based on the aforementioned embodiment and modifications thereof, the present invention is obviously not limited to such embodiment and the modifications. Other forms in which various modifications apparent to those skilled in the art are applied to the embodiment and the modifications, or forms structured by combining structural elements of different aspects of embodiment and modifications may be included within the scope of the present invention, unless such changes and modifications depart from the scope of the present invention.

It is to be noted that the present invention can be implemented not only as the fuel cell system, the storage battery system, and the power generation system described above but also as a method of controlling the fuel cell system. The method of controlling is, for example, a method of controlling a fuel cell system 10 which is connected to a storage battery 26 and supplies power to a load 32, the method including: generating power; obtaining battery information indicating a storage state of the storage battery 26; and selecting one of a first control mode and a second control mode based on the battery information when load power that is demand power of the load 32 changes from a first load power to a second load power, the first control mode being for supplying power from a power generation unit 16 to the load 32 by causing the power generation unit 16 to generate power without causing the storage battery 26 to charge and/or discharge, the second control mode being for causing the power generation unit 16 to generate power with a change rate of generation power being set to a value smaller than a value in the first control mode, by causing the storage battery 26 to supply power to the load 32 or causing the storage battery 26 to charge and/or discharge in such a manner that the storage battery 26 is charged with at least part of power supplied from the power generation unit 16, the change rate of generation power being a temporal change in the generation power of the power generation unit 16.

Alternatively, the method of controlling is a method of controlling the fuel cell system 10 which is connected to the storage battery system 20 and supplies power to the load 32, the method including: obtaining battery information related to a storage state such as a state of charge of the storage battery 26; and controlling, based on the obtained battery information, generation power of the power generation unit 16 which generates power and charge and/or discharge of the storage battery 26. In the controlling, when the generation power of the power generation unit 16 changes from a first power to a second power, the change rate of generation power that is a temporal change of the generation power during a period in which the generation power of the power generation unit 16 changes from the first power to the second power, by charging or discharging the storage battery based on the battery information of the storage battery 26.

In addition, the present invention may be implemented as a program causing a computer to execute the steps in the above-described control method, as a computer-readable recording medium such as a compact disc read only memory (CD-ROM) on which the program is recorded, or as information, data, or a signal indicating the program. Furthermore, the program, the information, the data and the signal may be distributed via a communication network such as the Internet.

In addition, the functional blocks of the processing systems (the control unit, the FC control unit, and the like) in the above-described block diagrams (FIG. 1, FIG. 12, and FIG. 13) may be implemented by an LSI which is a semiconductor integrated circuit. The LSI may be made as separate individual chips for each functional block, or as a single chip to include a part or all thereof.

INDUSTRIAL APPLICABILITY

The present invention can be utilized as a fuel cell system, and in particular as a fuel cell system which is capable of following a rapid load change without sacrificing a product life of the fuel cell system and without wasting surplus power, for example, as a fuel cell system which operates in cooperation with a storage battery.

REFERENCE SIGNS LIST

10, 10*a*, 10*b* fuel cell system
12, 12*a* control unit
12*b* FC control unit
14 obtaining unit
16 power generation unit
17 heater
18 FC power adjusting unit
18*a* DC/DC converter
18*b* DC/AC inverter
19 communication unit
20 storage battery system
20*a* storage battery unit
22 communication unit
24 detecting unit
26 storage battery
28 SB power adjusting unit
28*a* DC/AC inverter
28*b* DC/DC converter
30 power system
32 load
34 control apparatus

The invention claimed is:

1. A fuel cell system which is connected to a storage battery and supplies power to a load, the fuel cell system comprising:
 a power generation unit configured to generate power;
 an obtaining unit configured to obtain battery information indicating a storage state of the storage battery; and
 a control unit configured to select one of a first control mode and a second control mode based on the battery information when load power that is demand power of the load changes from a first load power to a second load power, the first control mode being for supplying power from the power generation unit to the load by causing the power generation unit to generate power without causing the storage battery to charge and discharge, the second control mode being a mode in which the control unit (i) determines a change rate of generation power having a value smaller than a value of a change rate of generation power in the first control mode, by causing the storage battery to supply power to the load or causing the storage battery to charge or discharge in such a manner that the storage battery is charged with at least part of power supplied from the power generation unit, and (ii) causes the power generation unit to generate power with the determined change rate of generation power in the second control mode, the change rate of generation power in the second control mode being a temporal change in the generation power of the power generation unit.

2. The fuel cell system according to claim 1,
 wherein the battery information includes a dischargeable power amount of the storage battery, and
 the control unit is configured to, when the load power increases from the first load power to the second load power that is larger than the first load power, select the first control mode when the dischargeable power amount is smaller than a predetermined threshold, and select the second control mode in which the change rate of generation power in the second control mode is set to the value smaller than the value of the change rate of generation power in the first control mode by causing the storage battery to supply power to the load, when the dischargeable power amount is equal to or larger than the predetermined threshold.

3. The fuel cell system according to claim 2,
 further connected to a power system, wherein the control unit is configured to cause the storage battery and the power system to supply power to the load when the second control mode is selected.

4. The fuel cell system according to claim 3, wherein the control unit is configured to, with reference to the dischargeable power amount of the storage battery obtained by the obtaining unit as the battery information, cause the storage battery to supply power to the load when a shortage of power which is an amount of shortfall of the generation power below the second load power is equal to or smaller than the dischargeable power amount, and cause the power system and the storage battery to supply power to the load when the shortage of power is larger than the dischargeable power amount.

5. The fuel cell system according to claim 2, wherein when the generation power of the power generation unit is smaller than the second load power after the second control mode is selected, the obtaining unit is configured to obtain the dischargeable power amount of the storage battery at regular time intervals, and the control unit is configured to select the first control mode when the dischargeable power amount obtained at regular time intervals falls below the predetermined threshold.

6. The fuel cell system according to claim 1, wherein the battery information includes a chargeable power amount of the storage battery, and the control unit is configured to, when the load power decreases from the first load power to the second load power that is smaller than the first load power, select the first control mode when the chargeable power amount is smaller than a predetermined threshold, and select the second control mode in which the change rate of generation power in the second control mode is set to the value smaller than the value of the change rate of generation power in the first control mode by causing the storage battery to be charged with at least part of power supplied from the power generation unit, when the chargeable power amount is equal to or larger than the predetermined threshold.

7. The fuel cell system according to claim 6, further comprising a dummy load which consumes power, wherein the control unit is configured to supply surplus power to the dummy load and the storage battery when the second control mode is selected, the surplus power being power exceeding the second load power among the generation power.

8. The fuel cell system according to claim 7, wherein the control unit is configured to supply the storage battery with the surplus power which is the power exceeding the second load power among the generation power, after supplying the dummy load with the surplus power, and when supplying the storage battery with the surplus power, supply the storage battery with power, among the surplus power, of an amount equal to or smaller than the chargeable power amount, with reference to the chargeable power amount of the storage battery obtained by the obtaining unit as the battery information.

9. The fuel cell system according to claim 6, wherein when the generation power of the power generation unit is larger than the second load power after the second control mode is selected, the obtaining unit is configured to obtain the chargeable power amount of the storage battery at regular time intervals, and the control unit is configured to select the first control mode when the chargeable power amount obtained at regular time intervals falls below the predetermined threshold.

10. The fuel cell system according to claim 1, wherein when the control unit selects the second control mode, the change rate of generation power in the second control mode determined by causing the storage battery to charge or discharge is smaller than a maximum change rate of power which has a predetermined impact on a product life of the fuel battery system.

11. The fuel cell system according to claim 1, wherein the battery information includes a state of charge of the storage battery, and when the control unit selects the second control mode, the control unit is configured to cause the storage battery to charge or discharge to prevent the state of charge included in the battery information from falling below a power amount necessary for activating the power generation unit.

12. The fuel cell system according to claim 1, further comprising a connection unit configured to detachably connect the storage battery with the fuel cell system.

13. A method of controlling a fuel cell system which is connected to a storage battery and supplies power to a load, the method comprising:

generating power;

obtaining battery information indicating a storage state of the storage battery; and selecting one of a first control mode and a second control mode based on the battery information when load power that is demand power of the load changes from a first load power to a second load power, the first control mode being for supplying power from a power generation unit to the load by causing the power generation unit to generate power without causing the storage battery to charge and discharge, the second control mode being a mode including (i) determining a change rate of generation power having a value smaller than a value of a change rate of generation power in the first control mode, by causing the storage battery to supply power to the load or causing the storage battery to charge or discharge in such a manner that the storage battery is charged with at least part of power supplied from the power generation unit, and (ii) causing the power generation unit to generate power with the change rate of generation power in the second control mode determined in the determining, the change rate of generation power in the second control mode being a temporal change in the generation power of the power generation unit.

14. A fuel cell system, comprising:

a storage battery;

a connection unit connected with the fuel cell system according to claim 1; and a power adjusting unit configured to perform adjustment for discharging the storage battery or charging the storage battery under a control of the control unit included in the fuel cell system.

* * * * *